United States Patent
He et al.

(10) Patent No.: US 12,470,136 B2
(45) Date of Patent: Nov. 11, 2025

(54) RESONANT SWITCHED CAPACITOR DIRECT CURRENT/DIRECT CURRENT CONVERTER AND POWER SYSTEM

(71) Applicant: HUAWEI TECHNOLOGIES CO., LTD., Guangdong (CN)

(72) Inventors: Zhengyan He, Nuremberg (DE); Haitao Chen, Shenzhen (CN); Xingzhong Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/324,207

(22) Filed: May 26, 2023

(65) Prior Publication Data

US 2023/0299669 A1   Sep. 21, 2023

Related U.S. Application Data

(63) Continuation of application No. PCT/CN2020/132088, filed on Nov. 27, 2020.

(51) Int. Cl.
*H02M 3/07* (2006.01)
*H02M 1/00* (2006.01)
*H02M 3/00* (2006.01)

(52) U.S. Cl.
CPC ............ *H02M 3/07* (2013.01); *H02M 1/007* (2021.05); *H02M 3/01* (2021.05)

(58) Field of Classification Search
CPC ............................................. H02M 3/07–078
See application file for complete search history.

(56) References Cited

U.S. PATENT DOCUMENTS

2016/0352218 A1   12/2016   Stauth et al.
2018/0041128 A1*   2/2018   Sandusky ............... H02M 3/24
(Continued)

FOREIGN PATENT DOCUMENTS

| CN | 101286694 A | 10/2008 |
| CN | 105006964 A | 10/2015 |

(Continued)

OTHER PUBLICATIONS

Ke Zou et al: "A Switched-Capacitor Voltage Tripler With Automatic Interleaving Capability. "IEEE Transactions On Power Electronics, vol. 27, No. 6, Jun. 2012, total 12 pages.

(Continued)

*Primary Examiner* — Peter M Novak

(57) ABSTRACT

A resonant switched capacitor direct current/direct current converter includes N resonant switched capacitor groups, M capacitors, and at least one LC series circuit, where N is an integer greater than or equal to 2, and M is an integer less than or equal to N. Each resonant switched capacitor group includes switches and a resonant circuit. The resonant circuit includes a resonant inductor and a resonant capacitor. The LC series circuit, namely, a circuit including an inductor and a capacitor that are connected in series, is connected between any two resonant switched capacitor groups. At the moment when the switch is turned off, the resonant inductor is not sufficient to implement complete discharging of a junction capacitor of the switch. The inductor is added, to implement complete discharging of the junction capacitor of the switch, that is, to remove a current, so that the switch implements soft switching.

17 Claims, 16 Drawing Sheets

(56) References Cited

U.S. PATENT DOCUMENTS

2019/0190368 A1* 6/2019 Rainer .................... H02M 3/07
2022/0166341 A1* 5/2022 Afridi ................. H02M 3/1582

FOREIGN PATENT DOCUMENTS

| CN | 109980932 A | 7/2019 | |
|---|---|---|---|
| CN | 111164869 A | 5/2020 | |
| EP | 2863529 A1 | 4/2015 | |
| EP | 3691101 A1 | 8/2020 | |
| WO | 2008047374 A2 | 4/2008 | |
| WO | WO-2019145015 A1 * | 8/2019 | .............. H02J 3/381 |

OTHER PUBLICATIONS

Extended European Search Report for Applicaton No. 20962874 dated Nov. 21, 2023, 11 pages.
PCT International Search Report for Application No. PCT/CN2020/132088 dated Nov. 27, 2020, 9 pages.

* cited by examiner

RESONANT SWITCHED CAPACITOR DIRECT CURRENT/DIRECT CURRENT CONVERTER AND POWER SYSTEM

CROSS-REFERENCE TO RELATED APPLICATION

This application a continuation of International Patent Application No. PCT/CN2020/132088, filed on Nov. 27, 2020, the disclosure of which is hereby incorporated by reference in its entirety.

TECHNICAL FIELD

This application relates to the field of power electronics technologies, and in particular, to a resonant switched capacitor direct current/direct current converter and a power system.

BACKGROUND

Currently, a switching power supply is widely used in various electrical equipment to provide satisfactory power for the electrical equipment.

For example, in an application scenario of artificial intelligence (AI, Artificial Intelligence) and a data center, a supply voltage for a service board is generally 48 V. However, a supply voltage for a chip and various loads inside the service board needs to be lower than 48 V. That is, the supply voltage of 48 V for the service board cannot be directly supplied to the chip and the loads, and generally needs to be bucked to a voltage such as 5 V, 3.3 V, and 1.8 V to be supplied to the chip and the loads.

Currently, a direct current (DC)/DC converter for bucking generally uses an isolated topology, for example, an LLC resonant DC/DC converter.

A main disadvantage of the LLC resonant DC/DC converter is a transformer. Because the transformer generally includes a primary winding, a secondary winding, and a magnetic core, and has a large size, a power supply also has a large size and is difficult to be thinned. To reduce the size, a switching frequency needs to be increased. However, an increase of the switching frequency means an increase of power consumption and a decrease of power supply efficiency.

SUMMARY

This application provides a resonant switched capacitor direct current/direct current converter and a power system, to reduce a size of the direct current/direct current converter and improve power conversion efficiency.

An embodiment of this application provides a resonant switched capacitor DC/DC converter. The DC/DC converter may be used in any scenario of a switching power supply, for example, power supply of an AI chip or a power board of a data center. The DC/DC converter may be used as a buck converter and subsequently connected to a voltage stabilizing circuit, so that a stable voltage can be output to a load. It should be understood that a specific application scenario of the DC/DC converter is not limited in this embodiment of this application. The DC/DC converter may be a bidirectional converter, and may be used as a boost converter or a buck converter. To reduce an area occupied by the circuit and reduce costs, only one LC series circuit may be included. A connection position of the LC series circuit is not specifically limited, and the LC series circuit may be specifically connected between any two resonant cavities. In a possible implementation, the LC series circuit may be connected between two resonant cavities with a high voltage, that is, connected between two resonant cavities close to a high-voltage side. Because a resonant inductor in the resonant cavity on the high-voltage side bears a high reverse voltage, a junction capacitor of a corresponding switch is prone to insufficient charging or discharging.

The DC/DC converter includes N resonant switched capacitor groups, M capacitors, and at least one LC series circuit, where N is an integer greater than or equal to 2, and M is an integer less than or equal to N. The LC series circuit includes a first inductor and a first capacitor that are connected in series. Each resonant switched capacitor group includes switches and a resonant circuit. The resonant circuit includes at least a resonant inductor and a resonant capacitor. Two ends of the LC series circuit are respectively connected to resonant circuits in two different resonant switched capacitor groups. Generally, a resonant inductor and a resonant capacitor are connected in series to form a series resonant circuit. The first capacitor in the LC series circuit functions to isolate a direct current and balance a voltage, to avoid that the first inductor cannot properly operate due to magnetic saturation in an operation process of charging and discharging. In this embodiment of this application, a quantity of LC series circuits connected to the resonant cavities is not limited, and one LC series circuit may be connected between any two resonant cavities.

The resonant inductor in each resonant switched capacitor group functions to reduce current impact of a charging and discharging current on the resonant capacitor, reduce impact of the charging and discharging current on the switch, reduce a loss, and improve power conversion efficiency of the converter. This embodiment of this application provides the resonant switched capacitor DC/DC converter. The LC series circuit, namely, the circuit including the inductor and the capacitor that are connected in series, is connected between any two resonant switched capacitor groups. At the moment when an MOS transistor is turned off, the resonant inductor is not sufficient to implement complete discharging of a junction capacitor of the MOS transistor. Therefore, the inductor is added, to implement complete discharging of the junction capacitor of the MOS transistor, that is, to remove a current, so that the MOS transistor implements soft switching. When each switch implements soft switching, power consumption of the entire resonant switched capacitor DC/DC converter can be reduced, and power conversion efficiency of the resonant switched capacitor DC/DC converter can be improved. In addition, because the direct current/direct current converter does not include a transformer, a size of the converter can be reduced. When the LC series circuit is connected between two resonant switched capacitor groups with a high voltage, soft switching effect is better.

In a possible implementation, M is equal to N, and the N resonant switched capacitor groups one-to-one correspond to the M capacitors. In other words, one resonant switched capacitor group corresponds to one of the M capacitors. Two input ends of each resonant switched capacitor group are respectively connected to two ends of the corresponding capacitor. Two output ends of each resonant switched capacitor group are respectively connected to two ends of an output capacitor.

In this embodiment of this application, the LC series circuit is added to the resonant cavities. Mainly, the first inductor in the LC series circuit is used to forcibly implement charging and discharging of the junction capacitor of the switch in the resonant cavity, to ensure soft switching of the switch during action. In addition, a turn-off angle of each resonant switched capacitor group can be reduced, and turn-off damage to each switch in each resonant switched capacitor group and an equivalent current effective value can be reduced. A larger equivalent current effective value indicates a higher switching loss corresponding to the switch. According to the technical solution provided in this embodiment, the turn-off angle of each resonant switched capacitor group may be closer to 180 degrees. This improves load regulation of the resonant switched capacitor DC/DC converter.

In a possible implementation, the N resonant switched capacitor groups include at least a first-type resonant switched capacitor group and a second-type resonant switched capacitor group. The first-type resonant switched capacitor group corresponds to at least two series-connected capacitors of the M capacitors. Two input ends of the first-type resonant switched capacitor group are respectively connected to two ends of the at least two series-connected capacitors. The second-type resonant switched capacitor group corresponds to one capacitor of the M capacitors. Two input ends of the second-type resonant switched capacitor group are respectively connected to two ends of the corresponding capacitor of the M capacitors.

A case in which at least one resonant switched capacitor group corresponds to a plurality of series-connected capacitors is different from the foregoing description. A voltage conversion ratio of the converter is changed by changing a connection relationship between the resonant switched capacitor group and the corresponding capacitor. For example, the voltage conversion ratio is increased without increasing a quantity of the resonant switched capacitor groups. This reduces hardware circuits, reduces a circuit board area occupied by the entire converter, and reduces costs.

In a possible implementation, an output capacitor and N capacitors are connected in series and then connected between two input ends of the converter. The output capacitor is connected between two output ends of the converter. The two input ends of the converter are connected to two ends of a direct current power supply. The converter is configured to buck a voltage of the direct current power supply and then output.

In a possible implementation, an output capacitor and N capacitors are connected in series and then connected between two output ends of the converter. The output capacitor is connected between two input ends of the converter. The two input ends of the converter are connected to two ends of a direct current power supply. The converter is configured to boost a voltage of the direct current power supply and then output.

In a possible implementation, each resonant switched capacitor group includes at least the following four switches: a first switch, a second switch, a third switch, and a fourth switch. A first end of the first switch is connected to a first end of a capacitor corresponding to the resonant switched capacitor group. A first end of the second switch is connected to a second end of the capacitor corresponding to the resonant switched capacitor group. A second end of the first switch is connected to a first end of the third switch. A second end of the second switch is connected to a first end of the fourth switch. The resonant capacitor and the resonant inductor are connected in series and then connected to the second end of the first switch and the second end of the second switch. A second end of the third switch is connected to a second end of the output capacitor. A second end of the fourth switch is connected to a first end of the output capacitor.

In a possible implementation, a first end of the LC series circuit is connected to a second end of a first switching transistor in one resonant switched capacitor group. A second end of the LC series circuit is connected to a second end of a first switching transistor in the other resonant switched capacitor group.

In a possible implementation, a first end of the LC series circuit is connected to a second end of a second switching transistor in one resonant switched capacitor group. A second end of the LC series circuit is connected to a second end of a second switching transistor in the other resonant switched capacitor group.

In a possible implementation, the first switch and the second switch act synchronously. The third switch and the fourth switch act synchronously. That the two switches act synchronously means that time sequence phases of drive signals corresponding to the two switches are the same. An implementation form of each switch is not limited in this embodiment of this application, and the switch may be a controllable switching transistor. The drive signal is applied to a control end, for example, a gate, of the controllable switching transistor, to control turn-off and turn-on of the controllable switching transistor.

In a possible implementation, phases of drive signals corresponding to all the resonant switched capacitor groups are the same. In other words, time sequences of the drive signals of all the resonant switched capacitor groups are the same. Switches at corresponding positions act synchronously. This facilitates generation of the time sequence of the drive signals. The drive signals of only one time sequence are generated.

In a possible implementation, phases of drive signals corresponding to all the resonant switched capacitor groups are staggered by a preset angle. In some scenarios, to control more flexibly, or better implement soft switching and reduce a power loss, phases of drive signals of switches at corresponding positions in different resonant switched capacitor groups may be controlled to be slightly staggered, to form a phase difference.

In a possible implementation, an inductance value of the first inductor is greater than an inductance value of the resonant inductor. When the inductance value of the first inductor is greater than that of the resonant inductor, better soft switching effect may be implemented, and charging and discharging of the junction capacitor of the MOS transistor may be enhanced. In this embodiment of this application, being greater than generally means that the inductance value of the first inductor is at least 10 times that of the resonant inductor.

In a possible implementation, a capacitance value of the first capacitor is greater than a capacitance value of the resonant capacitor.

In a possible implementation, when N is equal to M, a voltage conversion ratio of the converter is N+1. For example, when M=N=3, the voltage conversion ratio of the DC/DC converter is 4. In other words, quadruple bucking or boosting is implemented.

An embodiment of this application further provides a power system. For an advantage of the power system, refer to the advantage of the DC/DC converter described above. The power system includes a rectifier and a resonant switched capacitor direct current/direct current converter described above. The rectifier has an input end connected to an alternating current power supply, and is configured to convert an alternating current voltage output by the alternating current power supply into a direct current voltage. The resonant switched capacitor direct current/direct current converter has an input end connected to an output end of the rectifier, and is configured to convert a direct current voltage output by the rectifier and then output.

In a possible implementation, the power system further includes a voltage bucking and voltage stabilizing circuit. The voltage bucking and voltage stabilizing circuit has an input end connected to an output end of the resonant switched capacitor direct current/direct current converter, and is configured to buck a voltage output by the resonant switched capacitor direct current/direct current converter and then output a stable voltage.

In a possible implementation, the power system further includes a voltage stabilizing circuit. The voltage stabilizing circuit is connected between the rectifier and the resonant switched capacitor direct current/direct current converter, and is configured to stabilize a direct current voltage output by the rectifier and then provide for the resonant switched capacitor direct current/direct current converter.

According to the foregoing technical solutions, it may be learned that embodiments of this application have the following advantages.

This application discloses a resonant switched capacitor direct current/direct current converter. At least one LC series circuit is added. A quantity of LC series circuits is not limited. The LC series circuit is connected between any two resonant switched capacitor groups. The LC series circuit includes the first inductor and the first capacitor that are connected in series. At the moment when the switch in the resonant switched capacitor group is turned off, the resonant inductor in the resonant switched capacitor group is not sufficient to implement complete discharging of the junction capacitor of the switch. Therefore, the inductor in the LC series circuit is added, to implement complete discharging of the junction capacitor of the switch, that is, to remove a current on the junction capacitor of the switch, so that the switch can implement soft switching. This can reduce a turn-off angle of each resonant switched capacitor group, and improve load regulation of the converter. When each switch implements soft switching, power consumption of each switch during turn-on and turn-off can be reduced, so that power consumption of the entire resonant switched capacitor DC/DC converter can be reduced, and power conversion efficiency of the resonant switched capacitor DC/DC converter can be improved.

DESCRIPTION OF EMBODIMENTS

To make persons skilled in the art better understand the technical solutions provided in embodiments of this application, the following first describes an application scenario of a resonant switched capacitor converter and a principle of implementing direct current/direct current (direct current to direct current) voltage conversion.

The resonant switched capacitor direct current/direct current converter provided in embodiments of this application is a DC/DC converter. As the name implies, an input of the DC/DC converter is a direct current voltage, and an output of the DC/DC converter is also a direct current voltage. The resonant switched capacitor DC/DC converter provided in embodiments of this application may be used as a bidirectional DC/DC converter, and may buck a voltage from left to right, and may boost a voltage from right to left. In other words, an input end and an output end may be interchanged.

For example, the resonant switched capacitor DC/DC converter provided in embodiments of this application may be used in a switching power supply, that is, belongs to a DC/DC converter inside the switching power supply. The switching power supply is used as a part of a power system. The power system may further include a rectifier, configured to rectify an alternating current voltage of an alternating current power supply into a direct current voltage. The power system may supply power to an AI chip, that is, may be integrated on an AI board, or may be used as a power system of a board of a data center.

A specific application scenario of the converter is not limited in embodiments of this application. The resonant switched capacitor DC/DC converter provided in embodiments of this application may be applied to various application scenarios in which a switching power supply is required, such as a server, a communication base station, and a photovoltaic device. The switching power supply may finally output a voltage required by a load such as a chip or a control circuit.

The following uses an example in which the switched capacitor DC/DC converter is a buck converter for description.

Figure 1:
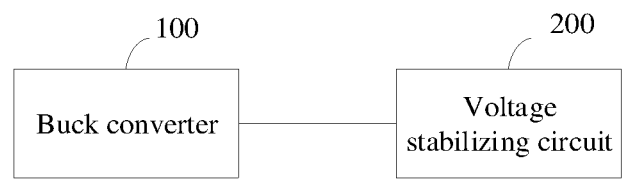
FIG. 1 is a schematic diagram of a switching power supply according to an embodiment of this application.

FIG. 1 is a schematic diagram of a switching power supply according to an embodiment of this application.

The switching power supply provided in this embodiment of this application may be used in AI or a data center, or may be used in a communication power supply. A specific application scenario of the switching power supply is not limited.

The switching power supply includes a buck converter 100 and a voltage stabilizing circuit 200.

The buck converter 100 may be a resonant switched capacitor DC/DC converter provided in this embodiment of this application. A specific implementation of the resonant switched capacitor DC/DC converter is described in detail in a subsequent embodiment.

An output end of the buck converter 100 is connected to an input end of the voltage stabilizing circuit 200.

An output end of the voltage stabilizing circuit 200 is connected to a load, and is configured to supply power to the load. The voltage stabilizing circuit 200 has a voltage bucking function and also has a voltage stabilizing function, to output a stable and controllable voltage.

In a possible implementation, for example, an input voltage of the buck converter 100 is 48 V, and an output voltage of the buck converter 100 is 12 V. The voltage stabilizing circuit 200 is configured to continue to buck the input voltage of 12 V to a voltage such as 5 V, 3.3 V, or 1.8 V to be supplied to a chip and various loads.

The buck converter 100 is configured to buck input 48 V to 12 V, and the obtained voltage of 12V is not directly supplied to the chip, but further bucked and stabilized by the voltage stabilizing circuit 200. In other words, the voltage stabilizing circuit 200 needs to output a precise voltage to meet a power supply requirement of the load.

Therefore, a voltage of 12 V output by the buck converter 100 may be controlled in an open-loop manner, and the output voltage is allowed to fluctuate within a specific range, provided that the output voltage satisfies an input voltage range of the voltage stabilizing circuit 200. Therefore, the buck converter for bucking 48 V to 12 V may be designed as an open-loop power supply in an application scenario of the AI and the data center. The open-loop power supply is a power supply whose output voltage changes with a change of an input voltage. The power supply does not have a function of independently stabilizing the output voltage. For example, a ratio of an input voltage Vin to an output voltage of the buck converter 100 may be 4:1 or 5:1. In addition, because there is no insulation and voltage resistance requirement between an output voltage and an input voltage, an isolated topology does not need to be forcibly used. In other words, a transformer does not need to be included. Therefore, the buck converter in a power system provided in this embodiment of this application may be implemented by using the resonant switched capacitor DC/DC converter, and the transformer does not need to be used for isolation. Therefore, a size of the converter can be reduced, and the converter is thinned and sized down, so that a size of the power system is reduced. For example, a board area occupied by the power system and the size of the power system are reduced, to meet the requirement of miniaturization.

The following describes an operation principle of a resonant switched capacitor DC/DC converter with reference to a schematic diagram of the resonant switched capacitor DC/DC converter.

Figure 2:
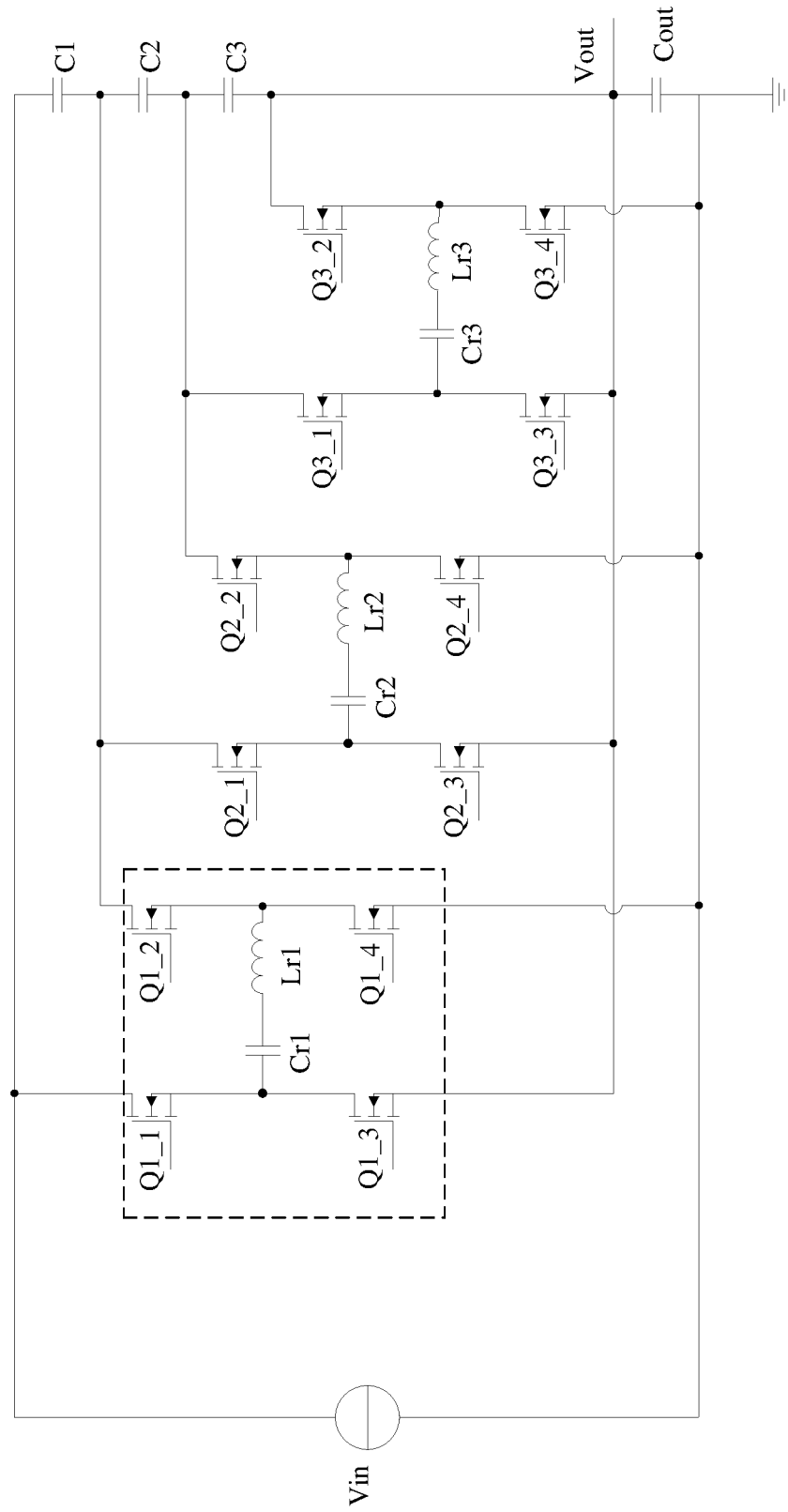
FIG. 2 is a schematic diagram of a resonant switched capacitor DC/DC converter according to an embodiment of this application.

FIG. 2 is a schematic diagram of a resonant switched capacitor DC/DC converter according to an embodiment of this application.

FIG. 2 describes an example in which the left side is an input end and the right side is an output end. In other words, the input end is connected to a direct current power supply Vin, and the output end is Vout. The converter is a buck converter, and is configured to buck a voltage of Vin and then output. Different quantities of resonant switched capacitor groups correspond to different buck conversion ratios. In addition, the right side may alternatively be an input end, and the left side is an output end. In this case, the converter is correspondingly a boost converter.

For ease of description and understanding, the following describes an example in which there are three resonant switched capacitor groups. A corresponding buck conversion ratio is 4:1. In other words, quadruple bucking of a voltage of Vin is implemented. For example, Vin is 48 V, and Vout is 12 V. In this embodiment of this application, a specific value of the voltage conversion ratio is not specifically limited, and may be set based on a requirement of an actual application scenario. A required voltage conversion ratio is obtained by changing a quantity or a connection relationship of resonant switched capacitor groups.

As shown in FIG. 2, in this embodiment, one resonant switched capacitor group corresponds to one capacitor. In other words, the resonant switched capacitor groups one-to-one correspond to capacitors. Three resonant switched capacitor groups correspond to three capacitors: a first capacitor C1, a second capacitor C2, and a third capacitor C3. C1, C2, and C3 are sequentially connected in series, and are also connected in series with an output capacitor COUT. In other words, C1 and COUT are sequentially connected in series, and C1 and COUT are sequentially connected in series and then connected to two ends of Vin. COUT is connected to two ends of Vout. When energy is transferred from Vin to Vout, COUT is used as the output capacitor, and C1 and COUT are connected in series and then used as an input capacitor. The corresponding letters in the figure are for ease of description, and represent numerals, and do not have special meanings.

For ease of understanding, four switches in each resonant switched capacitor group are referred to as a first switch to a fourth switch.

The dashed box in FIG. 2 corresponds to a first resonant switched capacitor group. Structures of all resonant switched capacitor groups are the same, and are separately described in the following.

The first resonant switched capacitor group is first described, and, includes four switches and a resonant circuit. The following first describes the first resonant switched capacitor group, where the four switches are respectively a first switch Q1_1, a second switch Q1_2, a third switch Q1_3, and a fourth switch Q1_4. A first end of Q1_1 is connected to a first end of C1, a first end of Q1_2 is connected to a second end of C1, a first end of Q1_3 is connected to a second end of Q1_1, a first end of Q1_4 is connected to a second end of Q1_2, a second end of Q1_3 is connected to Vout, and a second end of Q14 is grounded.

The following describes a second resonant switched capacitor group. For ease of understanding, four switches in each resonant switched capacitor group are referred to as a first switch to a fourth switch. The four switches are respectively a first switch Q2_1, a second switch Q2_2, a third switch Q2_3, and a fourth switch Q2_4. A first end of Q2_1 is connected to a first end of C2, a first end of Q2_2 is connected to a second end of C2, a first end of Q2_3 is connected to a second end of Q2_1, a first end of Q2_4 is connected to a second end of Q2_2, a second end of Q2_3 is connected to Vout, and a second end of Q2_4 is grounded.

The following describes the second resonant switched capacitor group, where four switches are respectively a first switch Q2_1, a second switch Q2_2, a third switch Q2_3, and a fourth switch Q2_4. A first end of Q2_1 is connected to a first end of C2, a first end of Q2_2 is connected to a second end of C2, a first end of Q2_3 is connected to a second end of Q2_1, a first end of Q2_4 is connected to a second end of Q2_2, a second end of Q2_3 is connected to Vout, and a second end of Q2_4 is grounded.

The following describes a third resonant switched capacitor group. For ease of understanding, four switches in each resonant switched capacitor group are referred to as a first switch to a fourth switch. The four switches are respectively a first switch Q3_1, a second switch Q3_2, a third switch Q3_3, and a fourth switch Q3_4. A first end of Q3_1 is connected to a first end of C2, a first end of Q3_2 is connected to a second end of C2, a first end of Q3_3 is connected to a second end of Q3_1, a first end of Q3_4 is connected to a second end of Q3_2, a second end of Q3_3 is connected to Vout, and a second end of Q3_4 is grounded.

In FIG. 2, the left side is an input end, the right side is an output end, and the resonant switched capacitor DC/DC converter is correspondingly a buck converter.

Figure 3:
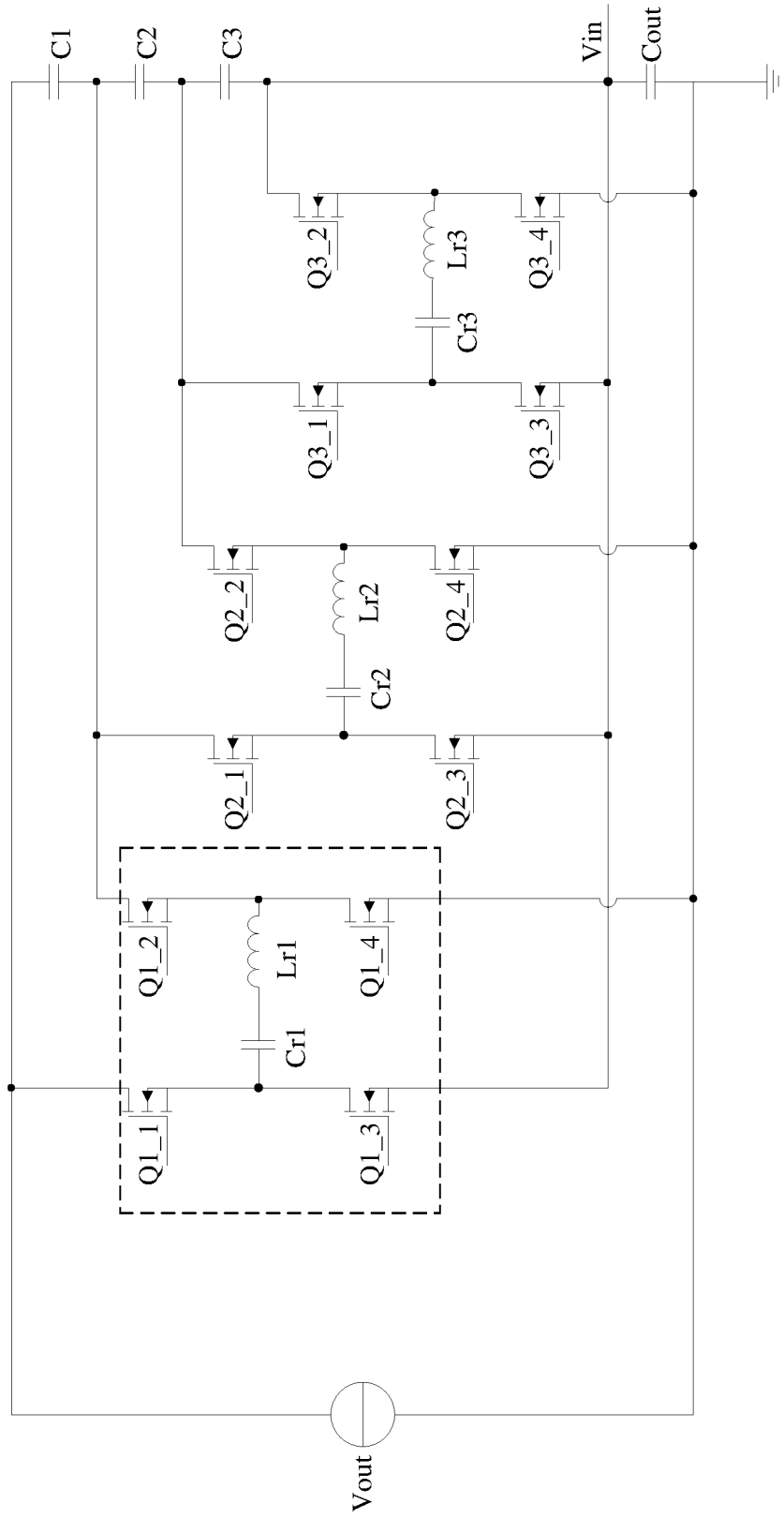
FIG. 3 is a schematic diagram of another resonant switched capacitor DC/DC converter according to an embodiment of this application.

In FIG. 3, the right side is an input end, the left side is an output end, and the resonant switched capacitor DC/DC converter is correspondingly a boost converter.

The buck converter corresponding to FIG. 2 is used as an example to describe an operation principle of voltage conversion. When Q1_1 and Q1_2 are turned on, and Q1_3 and Q1_4 are turned off, electric energy stored in C1 is transferred to Cr1. When Q1_1 and Q1_2 are turned off, and Q1_3 and Q1_4 are turned on, electric energy stored in Cr1 is transferred to Cout. Therefore, energy is transferred from the input end to the output end. Similarly, when Q2_1 and Q2_2 are turned on, and Q2_3 and Q2_4 are turned off, electric energy stored in C2 is transferred to Cr2. When Q2_1 and Q2_2 are turned off, and Q2_3 and Q2_4 are turned on, electric energy stored in Cr2 is transferred to Cout. Therefore, energy is transferred from the input end to the output end. When Q3_1 and Q3_2 are turned on, and Q3_3 and Q3_4 are turned off, electric energy stored in C3 is transferred to Cr3. When Q3_1 and Q3_2 are turned off, and Q3_3 and Q3_4 are turned on, electric energy stored in Cr3 is transferred to Cout. Therefore, energy is transferred from the input end to the output end. The voltage of Vin is equal to a sum of voltages on C1, C2, C3, and Cout. In addition, the voltage on C1 is equal to the voltage on Cr1, the voltage on C2 is equal to the voltage on Cr2, the voltage on C3 is equal to the voltage on Cr3, and the voltages on Cr1, Cr2, and Cr3 are all equal to the voltage on Cout. Therefore, the voltage of Vin is four times the voltage of Vout, so that quadruple bucking is implemented.

According to the foregoing analysis, regardless of whether the resonant switched capacitor DC/DC converter is a boost converter or a buck converter, the left side is a high-voltage side, and the right side is a low-voltage side. A similar trend also exists for a resonant switched capacitor group. A voltage of a resonant switched capacitor group connected to C1 is the highest, a voltage of a resonant switched capacitor group connected to C2 is the second highest, and a voltage of a resonant switched capacitor group connected to C3 is the lowest.

The resonant inductor in each resonant switched capacitor group functions to reduce current impact of a charging and discharging current on the resonant capacitor, reduce impact of the charging and discharging current on the switch, reduce a loss, and improve power conversion efficiency of the converter.

An implementation type of the switch is not specifically limited in this embodiment of this application. The switch is specifically a controllable switching transistor, for example, a metal oxide semiconductor (MOS) transistor or an insulated gate bipolar transistor (IGBT), or may be another type of switching device, provided that the switch device includes a control end, and a switch status of the switch device can be controlled by using the control end. The following describes an example in which the switch is an MOS.

For ease of description, an example in which the switch in the resonant switched capacitor group is an MOS transistor is used for description.

For MOS transistors Q1_1 and Q1_3, Q2_1 and Q2_3, and Q3_1 and Q3_3 in FIG. 2, if soft switching is implemented, the foregoing MOS transistors need to implement charging and discharging of junction capacitors corresponding to the MOS transistors at the turn-off moment by respectively using residual currents on Lr1, Lr2, and Lr3. In addition, in a resonant switched capacitor group with a higher voltage, a reverse voltage borne by Lr is higher. For example, a reverse voltage borne by Lr1 is Vo*2, and a reverse voltage borne by Lr2 is Vo. In other words, the reverse voltage borne by Lr1 is twice the reverse voltage borne by Lr2. Therefore, the current in Lr1 is attenuated faster, and there is no sufficient charge to implement complete charging or discharging of the junction capacitor of the corresponding MOS transistor. As a result, these MOS transistors cannot implement soft switching.

Based on the foregoing technical problem, this embodiment of this application provides the resonant switched capacitor DC/DC converter. The LC series circuit, namely, the circuit including the inductor and the capacitor that are connected in series, is connected between any two resonant switched capacitor groups. At the moment when an MOS transistor is turned off, the resonant inductor is not sufficient to implement complete discharging of a junction capacitor of the MOS transistor. Therefore, the inductor is added, to implement complete discharging of the junction capacitor of the MOS transistor, that is, to remove a current, so that the MOS transistor implements soft switching. When each switch implements soft switching, power consumption of the entire resonant switched capacitor DC/DC converter can be reduced, and power conversion efficiency of the resonant switched capacitor DC/DC converter can be improved.

Converter Embodiments

Figure 4:
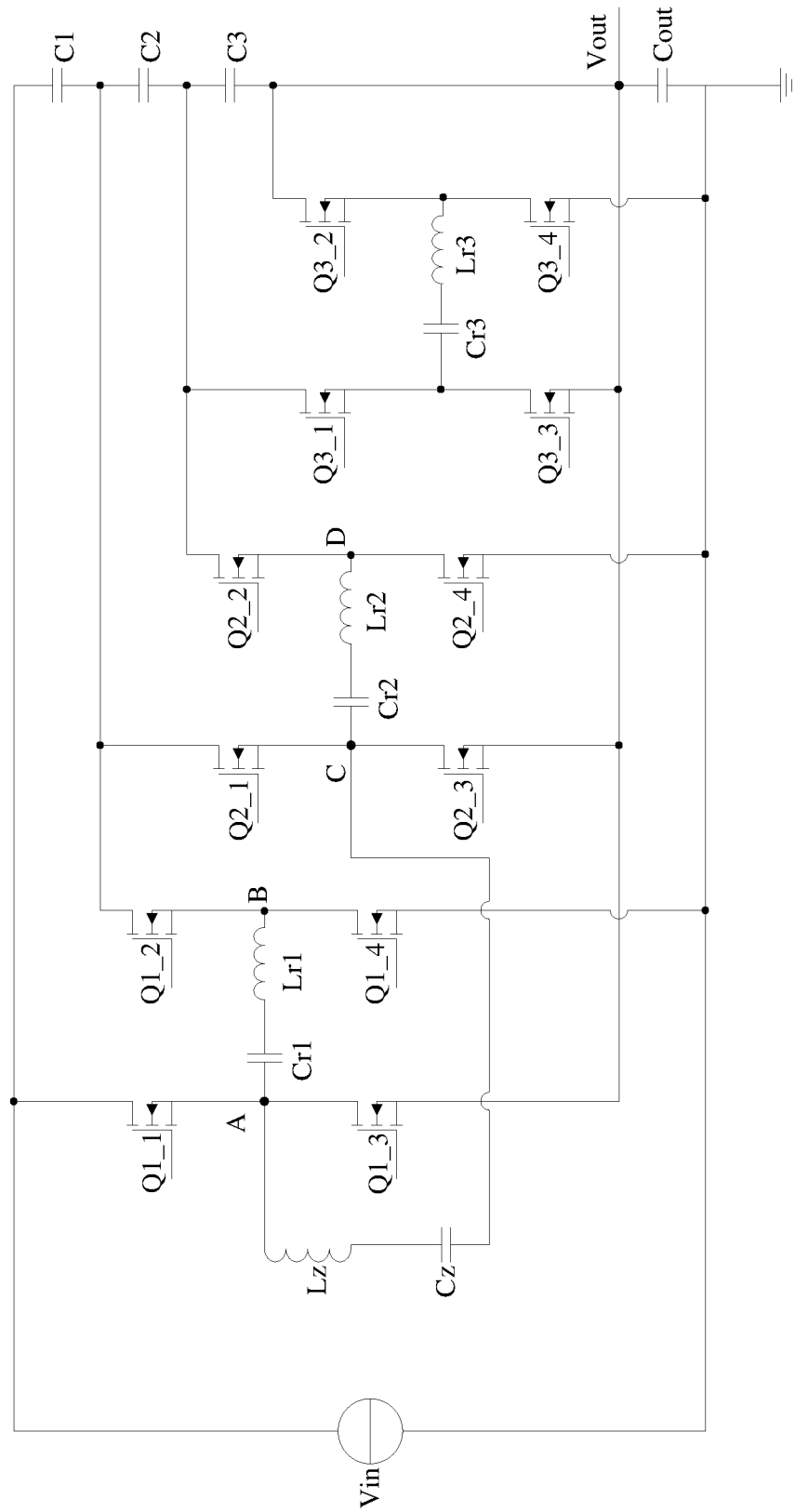
FIG. 4 is a schematic diagram of a resonant switched capacitor DC/DC converter according to an embodiment of this application.

FIG. 4 is a schematic diagram of a resonant switched capacitor DC/DC converter according to an embodiment of this application.

The resonant switched capacitor DC/DC converter provided in this embodiment of this application includes N resonant switched capacitor groups, M capacitors, and at least one LC series circuit, where N is an integer greater than or equal to 2, and M is an integer less than or equal to N. In other words, M may be equal to N, or M may be less than N. For example, when N is 3, M may be 2. The quantity M may be set based on a connection relationship and a quantity of resonant switched capacitor groups. This is not specifically limited in this embodiment of this application.

Each resonant switched capacitor group includes switches and a resonant circuit. The resonant circuit includes a resonant inductor and a resonant capacitor. Generally, the resonant inductor and the resonant capacitor are connected in series to form a series resonant circuit. A function of the resonant inductor has been described above. Details are not described herein in this paragraph again.

Two ends of the LC series circuit are respectively connected to one end of a resonant circuit in each of two different resonant switched capacitor groups. The LC series circuit includes a first inductor and a first capacitor that are connected in series.

Each resonant switched capacitor group may be considered as a resonant cavity. When the resonant cavity operates, the switch in the resonant cavity cannot implement complete soft switching. Therefore, to resolve the technical problem, in this embodiment of this application, the LC series circuit is added to the resonant cavities. Mainly, the first inductor in the LC series circuit is used to forcibly implement charging and discharging of the junction capacitor of the switch in the resonant cavity, to ensure soft switching of the switch during action. In addition, a turn-off angle of each resonant switched capacitor group can be reduced, and turn-off damage to each switch in each resonant switched capacitor group and an equivalent current effective value can be reduced. A larger equivalent current effective value indicates a higher switching loss corresponding to the switch. According to the technical solution provided in this embodiment, the turn-off angle of each resonant switched capacitor group may be closer to 180 degrees. This improves load regulation of the resonant switched capacitor DC/DC converter.

When an operation frequency of the converter is equal to a resonance frequency, namely, when the converter operates at a resonance point, a gain of each resonant cavity is 1. In other words, an output voltage is equal to an input voltage. In this case, the output voltage is slightly affected by a load and scarcely affected by the load. When the operation frequency of the converter is not equal to the resonance frequency, the output voltage of the resonant cavity decreases. A larger load indicates a quicker decrease of the output voltage of the resonant cavity. In other words, the output voltage droops. Therefore, to avoid that the output voltage is affected by the load during a load change, that is, to improve load regulation, the converter needs to operate at the resonance frequency. The turn-off angle of 180 degrees is equivalent to 50% of a positive half cycle and 0% of a negative half cycle. The operation frequency corresponding to a fundamental wave obtained through Fourier decomposition is a corresponding actual operation frequency. However, when the turn-off angle is less than 180 degrees, the operation frequency corresponding to the fundamental wave obtained through Fourier decomposition is greatly affected by a high-order harmonic wave, and consequently, the output voltage of the resonant cavity decreases.

The first capacitor in the LC series circuit functions to isolate a direct current and balance a voltage, to avoid that the first inductor cannot properly operate due to magnetic saturation in an operation process of charging and discharging.

In this embodiment of this application, a quantity of LC series circuits connected to the resonant cavities is not limited, and one LC series circuit may be connected between any two resonant cavities. For example, when N is 3, two LC series circuits may be included. One LC series circuit is connected between a first resonant cavity and a second resonant cavity, and the other LC series circuit is connected between the second resonant cavity and a third resonant cavity. In addition, to reduce an area occupied by the circuit and reduce costs, only one LC series circuit may be included. A connection position of the LC series circuit is not specifically limited, and the LC series circuit may be specifically connected between any two resonant cavities. In a possible implementation, the LC series circuit may be connected between two resonant cavities with a high voltage, that is, connected between two resonant cavities close to a high-voltage side. Because a resonant inductor in the resonant cavity on the high-voltage side bears a high reverse voltage, a junction capacitor of a corresponding switch is prone to insufficient charging or discharging.

For a buck converter, an output capacitor and N capacitors are connected in series and then connected between two input ends of the converter. The output capacitor is connected between two output ends of the converter. The two input ends of the converter are connected to two ends of a direct current power supply. The converter is configured to buck a voltage of the direct current power supply and then output.

For a boost converter, an output capacitor and N capacitors are connected in series and then connected between two output ends of the converter. The output capacitor is connected between two input ends of the converter. The two input ends of the converter are connected to two ends of a direct current power supply. The converter is configured to boost a voltage of the direct current power supply and then output.

In this embodiment of this application, whether the resonant switched capacitor DC/DC converter is a boost converter or a buck converter is not specifically limited. In other words, the input end and the output end may be interchanged. In addition, bidirectional energy flow may also be implemented.

For ease of understanding, a scenario in which M is equal to N is first described.

As shown in FIG. 4, an example in which N is 3 and M is 3 is used for description. That is, M is equal to N. The N resonant switched capacitor groups one-to-one correspond to the M capacitors. In other words, one resonant switched capacitor group corresponds to one capacitor. For the converter in this case, when N is equal to M, a voltage conversion ratio of the converter is N+1. In other words, the voltage conversion ratio corresponding to FIG. 4 is 4. Persons skilled in the art may set a quantity of resonant capacitor groups and a quantity of capacitors based on an actual requirement.

Specifically, two input ends of each resonant switched capacitor group are respectively connected to two ends of the corresponding capacitor. Two output ends of each resonant switched capacitor group are connected to two ends of the output capacitor.

Each resonant switched capacitor group includes at least the following four switches: a first switch, a second switch, a third switch, and a fourth switch. A first end of the first switch is connected to a first end of a corresponding capacitor. A first end of the second switch is connected to a second end of the corresponding capacitor. A second end of the first switch is connected to a first end of the third switch. A second end of the second switch is connected to a first end of the fourth switch. The resonant capacitor and the resonant inductor are connected in series and then connected to the second end of the first switch and the second end of the second switch. A second end of the third switch is connected to a second end of the output capacitor. A second end of the fourth switch is connected to a first end of the output capacitor. For details, refer to descriptions of connection relationships between internal components in a resonant switched capacitor group corresponding to FIG. 2.

In this embodiment of this application, a specific location at which the LC series circuit is connected to any two resonant switched capacitor groups is not specifically limited, and at least the following two connection manners may be included:

Manner 1:

A first end of the LC series circuit is connected to a second end of a first switching transistor in one resonant switched capacitor group. A second end of the LC series circuit is connected to a second end of a first switching transistor in the other resonant switched capacitor group.

Manner 2:

A first end of the LC series circuit is connected to a second end of a second switching transistor in one resonant switched capacitor group. A second end of the LC series circuit is connected to a second end of a second switching transistor in the other resonant switched capacitor group.

A difference between FIG. 4 and FIG. 2 lies in that the LC series circuit is added between a first resonant switched capacitor group and a second resonant switched capacitor group. In other words, a first inductor Lz and a first capacitor Cz form the LC series circuit. Connection relationships of other parts in FIG. 3 are the same as those in FIG. 4. Details are not described herein in relation to FIG. 4 again.

A first end of Lz is connected to a second end of a first switch Q1_1 in the first resonant switched capacitor group. A second end of Lz is connected to a first end of Cz. A second end of Cz is connected to a second end of a first switch Q2_1 in the second resonant switched capacitor group.

This embodiment of this application does not specifically limit a value relationship between Lz and a resonant inductor in each resonant capacitor group. In a possible implementation, an inductance value of the first inductor Lz may be greater than an inductance value of the resonant inductor. For example, in FIG. 4, Lz is greater than Lr1, and Lz is greater than Lr2. A larger inductance value of Lz indicates better soft switching effect. A multiple of Lz greater than Lr1 may be set based on a requirement. For example, a ratio of Lz to Lr1 may be greater than 10. Similarly, a ratio of Lz to Lr2 may also be greater than 10.

In addition, in this embodiment of this application, a value relationship between a capacitance value of the first capacitor in the LC series circuit and a capacitance value of a resonant capacitor in each resonant switched capacitor group is not specifically limited either. In a feasible implementation, the capacitance value of the first capacitor Cz may be greater than the capacitance value of the resonant capacitor. For example, the capacitance value of Cz is greater than the capacitance value of Cr1.

Lz and Cz shown in FIG. 4 are connected in series to a high-voltage side A of the first resonant switched capacitor group and a high-voltage side C of the second resonant switched capacitor group. This facilitates soft switching of the switches in the resonant switched capacitor group. As shown in the figure, a voltage at a point A of the first resonant switched capacitor group is greater than a voltage at a point B. Similarly, a voltage at a point C of the second resonant switched capacitor group is greater than a voltage at a point D. Because the voltage on the high-voltage side is higher, Lz needs to be added to forcibly implement charging and discharging of the junction capacitors of the switches, to implement soft switching of the switches, including Q1_1 and Q1_3 in the first resonant switched capacitor group, and Q2_1 and Q2_3 in the second resonant switched capacitor group.

The following analyzes an operation principle of the LC series circuit to implement soft switching with reference to the figure.

When Q1_1 and Q1_2 are turned on, a potential of the point A is greater than a potential of the point C. When Q1_1 is turned off, a current at the point A flows to the point C through Lz and Cz. Lz has a function of maintaining a current. Therefore, to maintain the current from the point A to the point C, Lz extracts a current from the junction capacitors of Q1_1 and Q1_3, so that the junction capacitors of Q1_1 and Q1_3 discharge, and Q1_1 and Q1_3 are equivalent to a parallel connection. In this case, the current at the point A is not extracted from Cr1 because the current at the point A flows to the point B. When the potential of the point A gradually decreases to be equal to Vout, voltages at both ends of Q1_3 are equal. In this case, Q1_3 is turned on, so that Q1_3 implements soft switching.

The foregoing describes a process of turning off Q1_3. The following describes a process of turning off Q1_1.

Phases of drive pulse signals corresponding to the first resonant cavity and the second resonant cavity may be staggered. Therefore, when Q2_1 is turned on, the potential of the point C is greater than the potential of the point A. When Q3_1 is turned off, a current at the point C flows to the point A through Lz and Cz. In this case, the junction capacitor of Q3_1 is charged, and a voltage at the point A increases. When the voltage at the point A increases to be equal to Vin, that is, when voltages at two ends of Q1_1 are equal, Q1_1 is turned on, so that Q1_1 implements soft switching.

In this embodiment of this application, a time sequence of drive signals of switches in the resonant switched capacitor groups is not specifically limited. For example, corresponding switches in the resonant switched capacitor groups act synchronously. In other words, the drive signals corresponding to the resonant switched capacitor groups are synchronous. In other words, for all the resonant switched capacitor groups, the first switch and the second switch act synchronously, and the third switch and the fourth switch act synchronously. In other words, phases of drive signals of all the resonant switched capacitor groups are the same. The foregoing is merely an example for description. For example, for a same resonant switched capacitor group, there may be a phase difference between a drive signal of the first switch and a drive signal of the second switch. For example, the first switch is turned on first, and the second switch is turned on later.

In the foregoing descriptions, phases of drive signals of corresponding switches in all the resonant switched capacitor groups are the same. For example, in three resonant switched capacitor groups, phases of drive signals of first switches are the same, phases of drive signals of second switches are the same, phases of drive signals of third switches are the same, and phases of drive signals of fourth switches are the same.

In another implementation, phases of drive signals of all the resonant switched capacitor groups may be staggered by a preset angle. For example, in FIG. 4, phases of drive signals corresponding to Q1_1, Q2_1, and Q3_1 are sequentially staggered by a preset angle. In other words, phases of drive signals of first switches in all the resonant switched capacitor groups are different.

As shown in FIG. 4, the LC series circuit is connected to the first resonant switched capacitor group and the second resonant switched capacitor group. The following describes a case in which an LC series circuit is connected to a second resonant switched capacitor group and a third resonant switched capacitor group.

Figure 5:
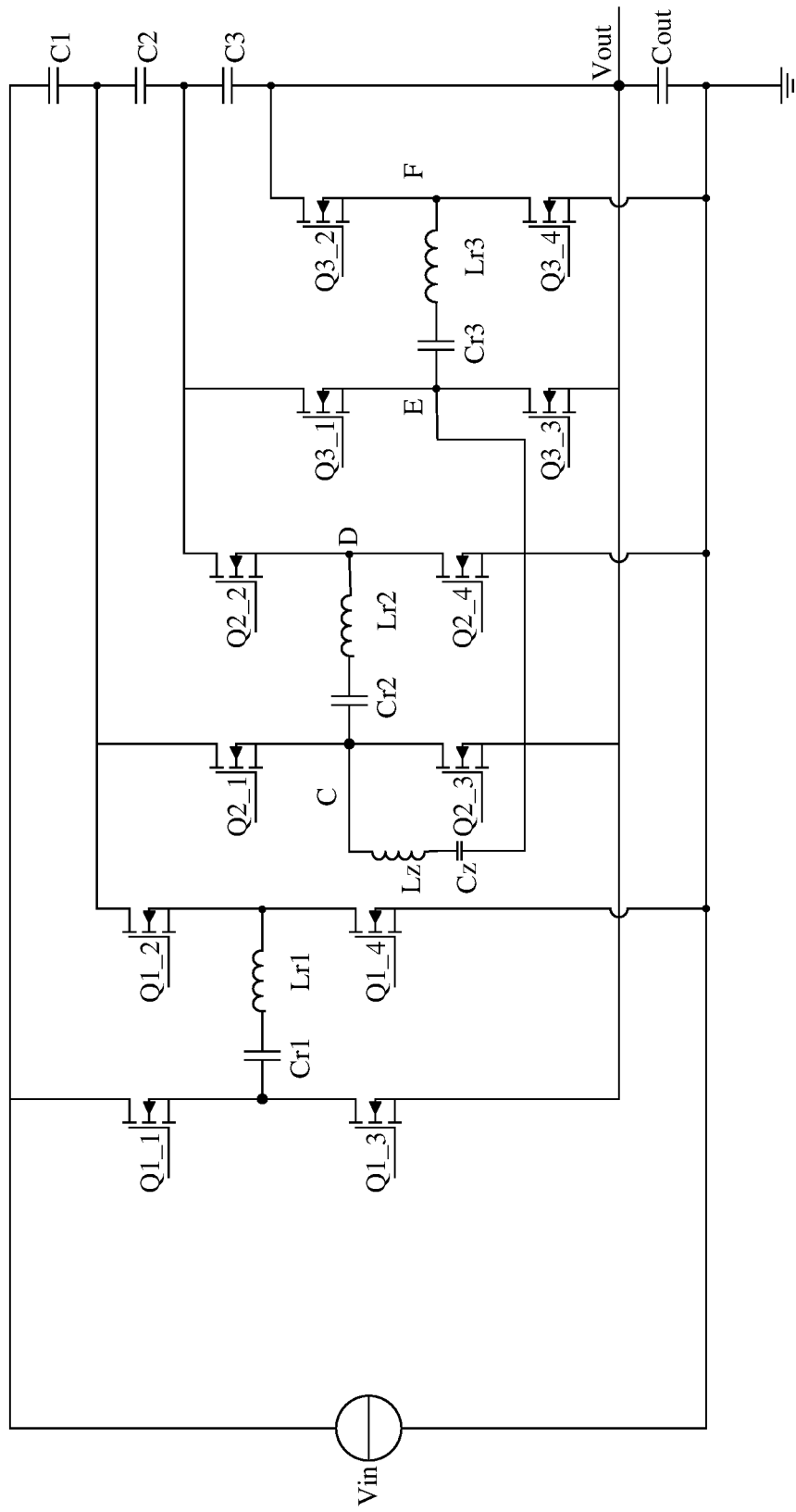
FIG. 5 is a schematic diagram of another resonant switched capacitor DC/DC converter according to an embodiment of this application.

FIG. 5 is a schematic diagram of another resonant switched capacitor DC/DC converter according to an embodiment of this application.

A difference between FIG. 5 and FIG. 4 lies in that, in FIG. 5, a first end of Lz is connected to a second end C of a first switch Q2_1 in the second resonant switched capacitor group, a second end of Lz is connected to a first end of Cz, and a second end of Cz is connected to a second end E of a first switch Q3_1 in the third resonant switched capacitor group.

Connection relationships of other parts in FIG. 5 are the same as those in FIG. 4 and FIG. 2. Details are not described herein in relation to FIG. 5 again. Operation principles and advantages described in the part corresponding to FIG. 4 are also applicable to the embodiment corresponding to FIG. 5.

In FIG. 5, for the second resonant switched capacitor group, a voltage at a point C is greater than a voltage at a point D. Similarly, for the third resonant switched capacitor group, a voltage at a point E is greater than a voltage at a point F.

The following describes a case in which an LC series circuit is connected to a first resonant switched capacitor group and a third resonant switched capacitor group.

Figure 6:
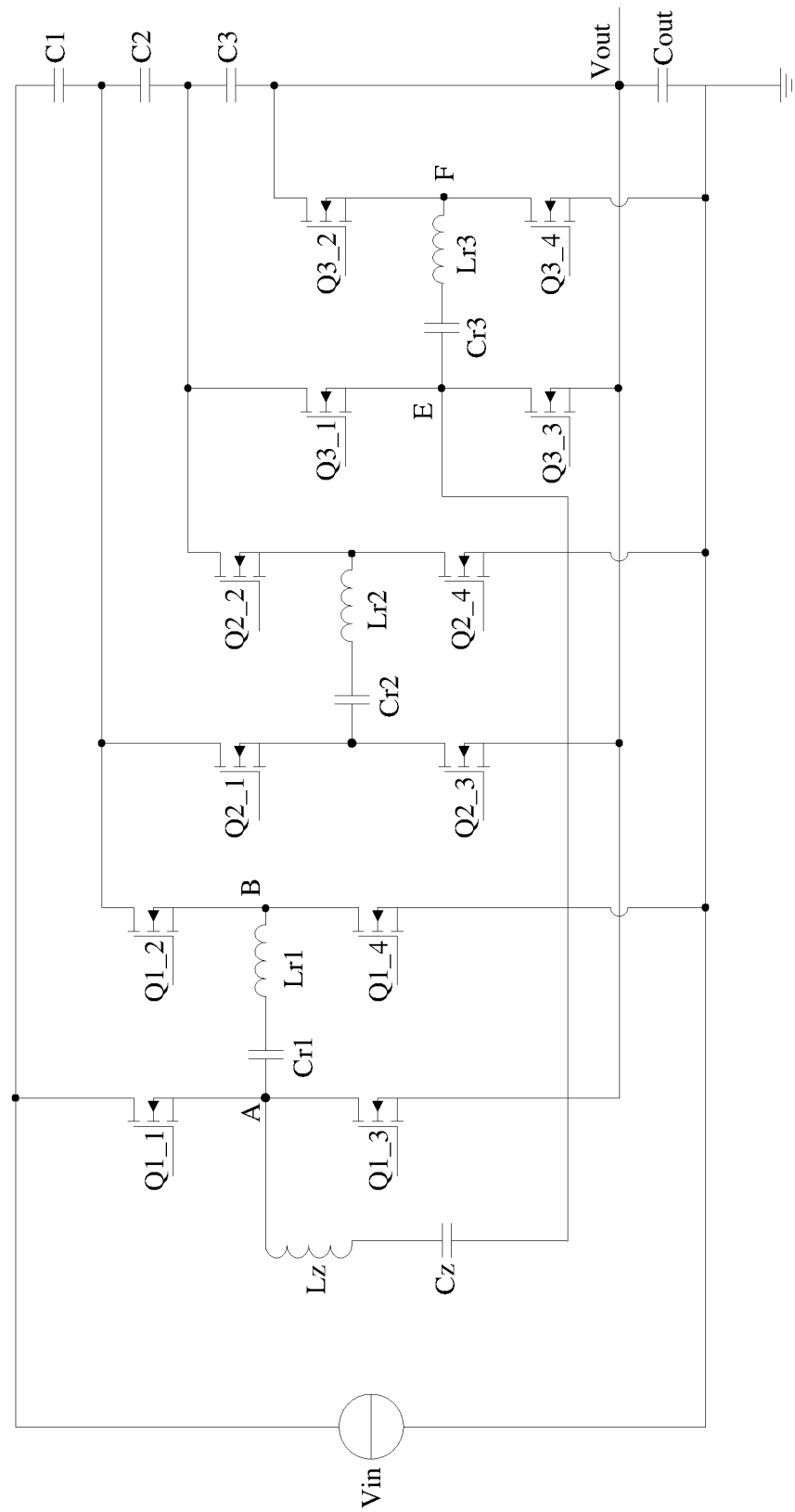
FIG. 6 is a schematic diagram of still another resonant switched capacitor DC/DC converter according to an embodiment of this application.

FIG. 6 is a schematic diagram of still another resonant switched capacitor DC/DC converter according to an embodiment of this application.

A difference between FIG. 6 and FIG. 4 lies in that, in FIG. 6, a first end of Lz is connected to a second end A of a first switch Q1_1 in the first resonant switched capacitor group, a second end of Lz is connected to a first end of Cz, and a second end of Cz is connected to a second end E of a first switch Q3_1 in the third resonant switched capacitor group.

Connection relationships of other parts in FIG. 6 are the same as those in FIG. 4 and FIG. 2. Details are not described herein in relation to FIG. 6 again. Operation principles and advantages described in the part corresponding to FIG. 4 are also applicable to the embodiment corresponding to FIG. 6.

In FIG. 6, for the first resonant switched capacitor group, a voltage at a point A is greater than a voltage at a point B. Similarly, for the third resonant switched capacitor group, a voltage at a point E is greater than a voltage at a point F.

The LC series circuits in FIG. 4 to FIG. 6 are all connected to high-voltage sides of any two resonant switched capacitor groups. The following describes an implementation in which an LC series circuit is connected to low-voltage sides of any two resonant switched capacitor groups.

Figure 7:
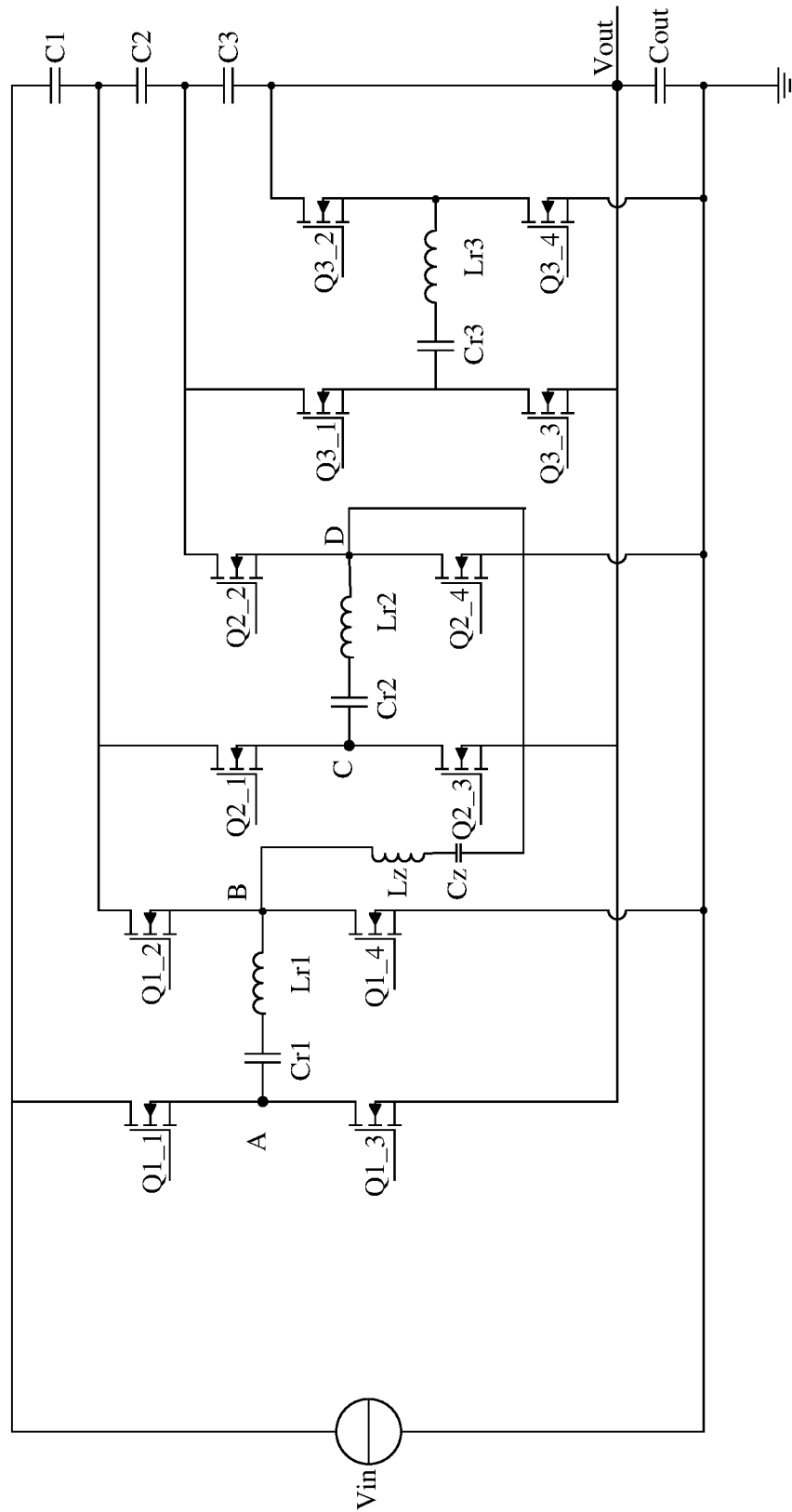
FIG. 7 is a schematic diagram of further still another resonant switched capacitor DC/DC converter according to an embodiment of this application.

FIG. 7 is a schematic diagram of further still another resonant switched capacitor DC/DC converter according to an embodiment of this application.

In the converter shown in FIG. 7, the LC series circuit is connected to a low-voltage side of a first resonant switched capacitor group and a low-voltage side of a second resonant switched capacitor group. In FIG. 7, a first end of Lz is connected to a second end B of a second switch Q1_2 in the first resonant switched capacitor group, a second end of Lz is connected to a first end of Cz, and a second end of Cz is connected to a second end D of a second switch Q2_2 in the second resonant switched capacitor group.

Figure 8:
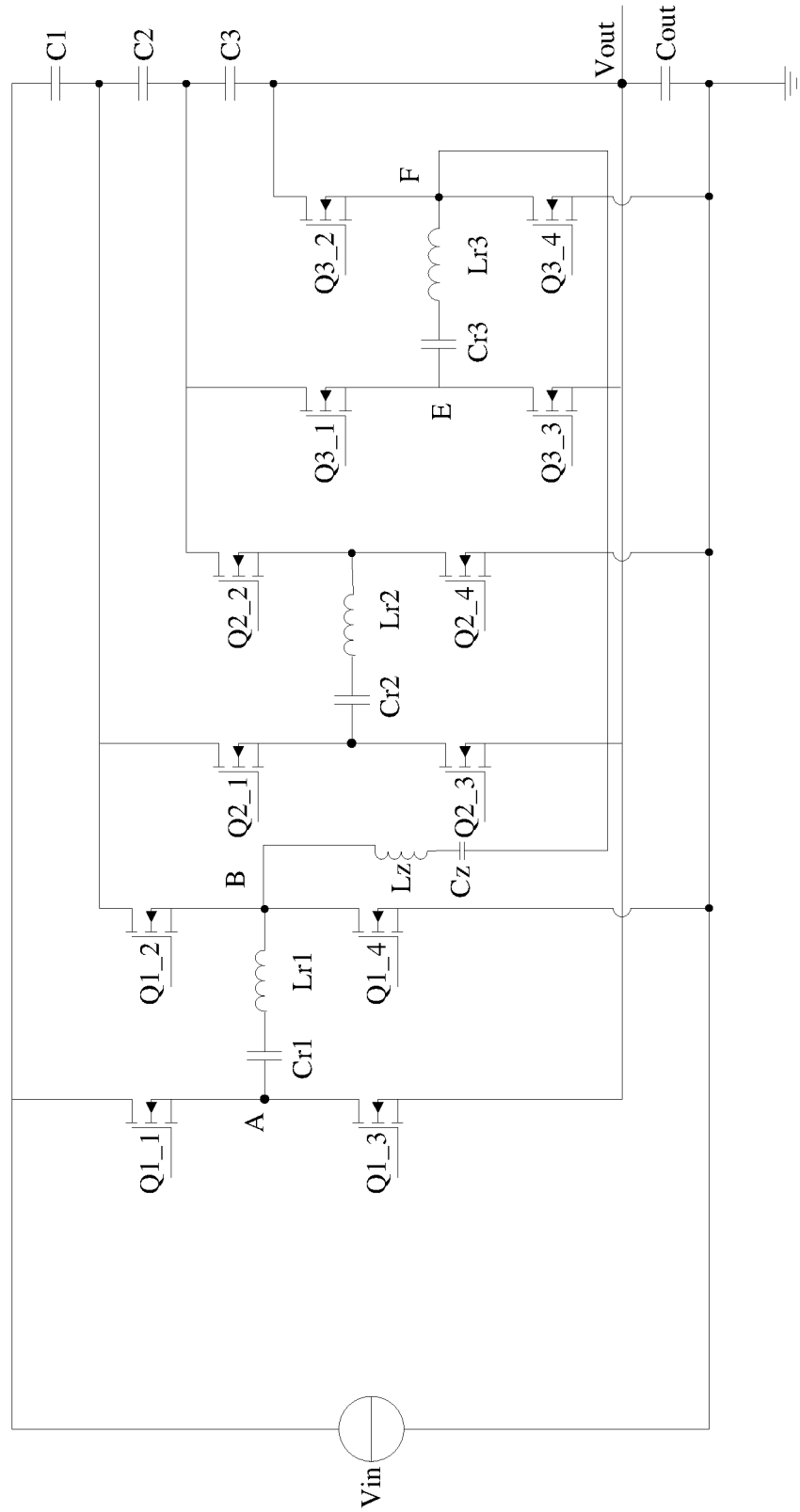
FIG. 8 is a schematic diagram of still another resonant switched capacitor DC/DC converter according to an embodiment of this application.

The following describes a case in which an LC series circuit is connected to a low-voltage side of a first resonant switched capacitor group and a low-voltage side of a third resonant switched capacitor group. FIG. 8 is a schematic diagram of still another resonant switched capacitor DC/DC converter according to an embodiment of this application.

In FIG. 8, a first end of Lz is connected to a second end B of a second switch Q1_2 in the first resonant switched capacitor group, a second end of Lz is connected to a first end of Cz, and a second end of Cz is connected to a second end F of a second switch Q3_2 in the third resonant switched capacitor group.

Figure 9:
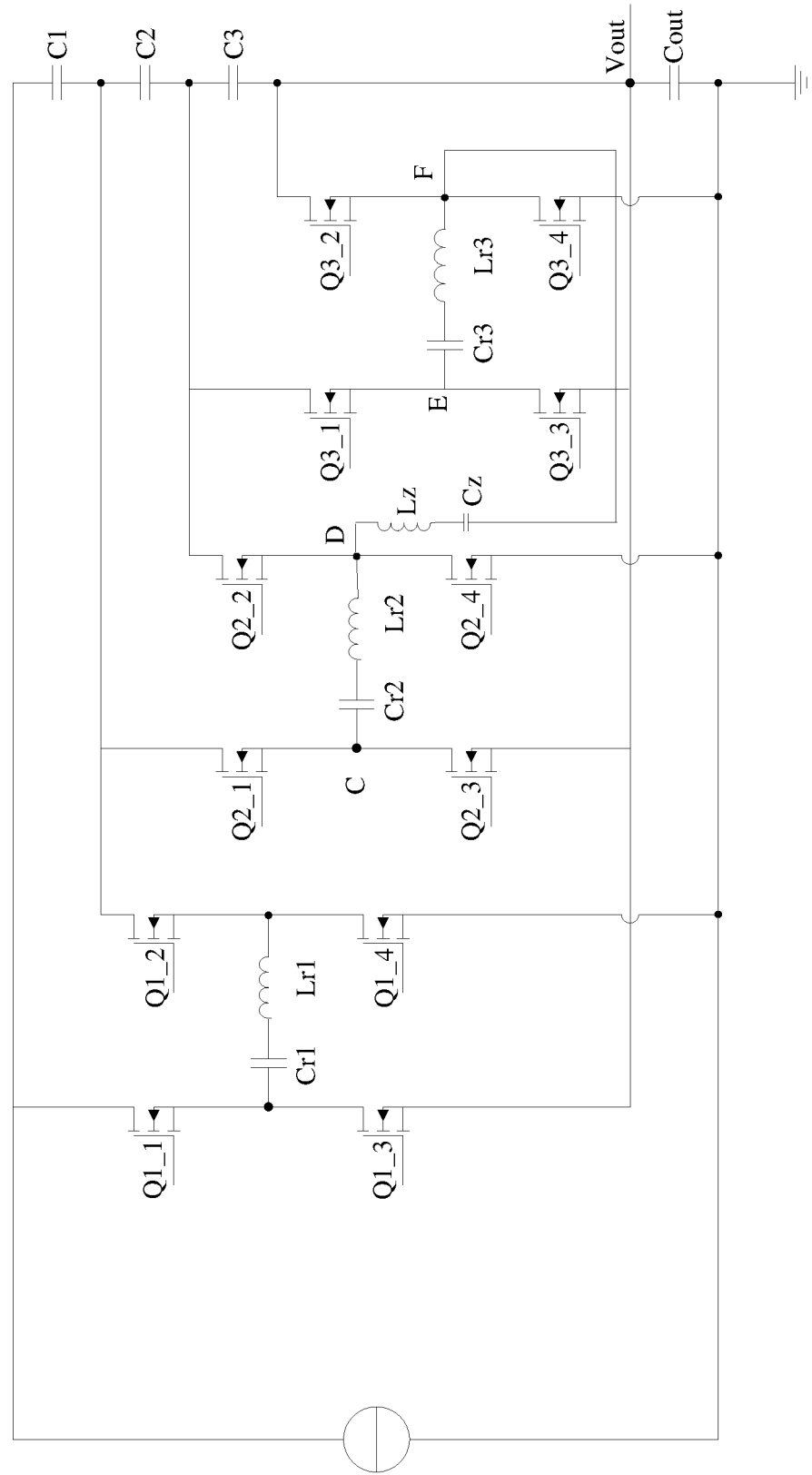
FIG. 9 is a schematic diagram of further still another resonant switched capacitor DC/DC converter according to an embodiment of this application.

The following describes a case in which an LC series circuit is connected to a low-voltage side of a second resonant switched capacitor group and a low-voltage side of a third resonant switched capacitor group. FIG. 9 is a schematic diagram of still another resonant switched capacitor DC/DC converter according to an embodiment of this application.

In FIG. 9, a first end of Lz is connected to a second end D of a second switch Q2_2 in the second resonant switched capacitor group, a second end of Lz is connected to a first end of Cz, and a second end of Cz is connected to a second end F of a second switch Q3_2 in the third resonant switched capacitor group.

The foregoing FIG. 7 to FIG. 9 describe a case in which the LC series circuit is connected to low-voltage sides of any two resonant switched capacitor groups. With reference to the accompanying drawings, the following describes in detail another hybrid connection case in which one end of an LC series circuit may be connected to a high-voltage side of one resonant switched capacitor group, and the other end of the LC series circuit may be connected to a low-voltage side of the other resonant switched capacitor group.

Figure 10:
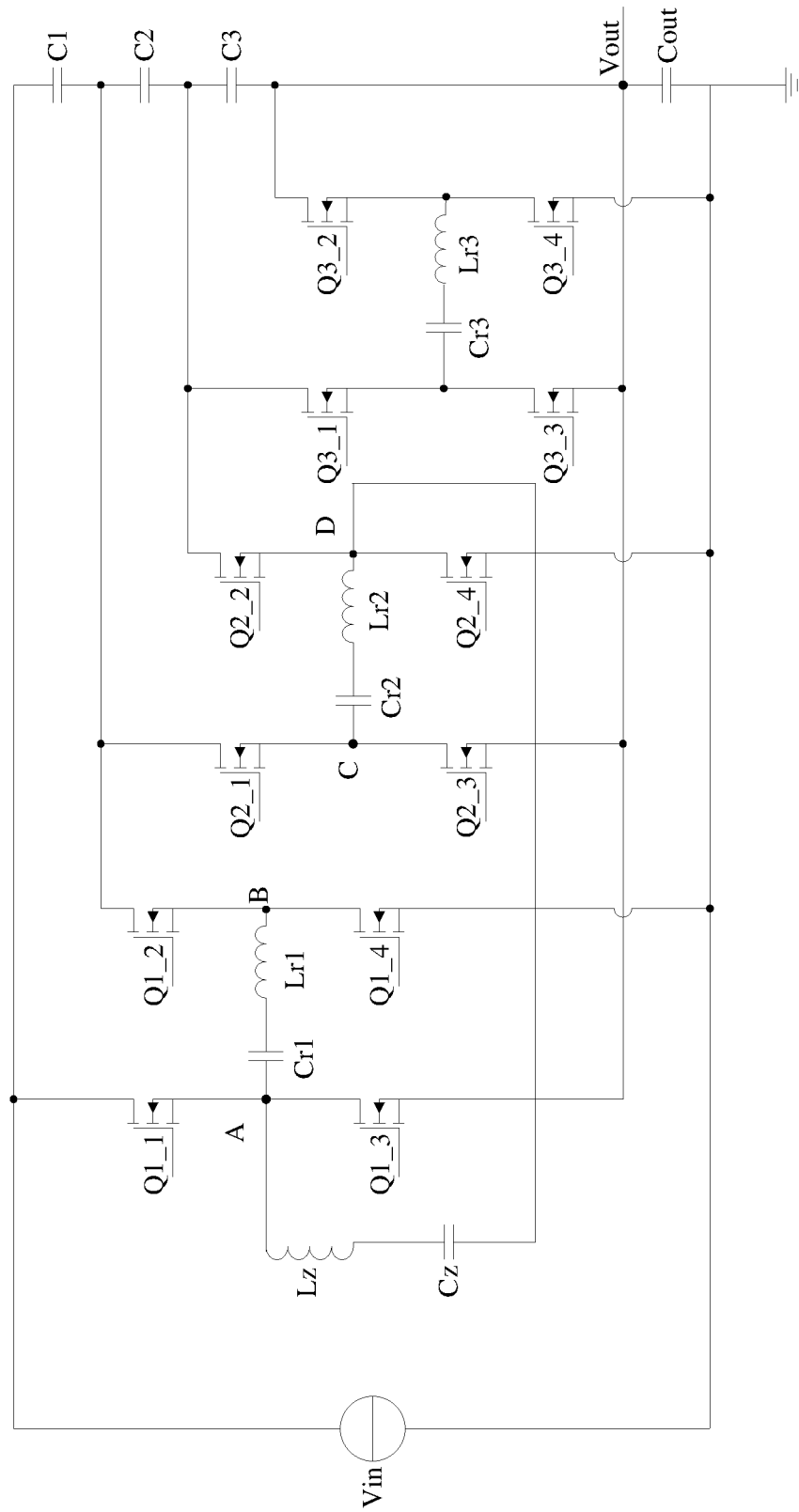
FIG. 10 is a schematic diagram of a hybrid connection of an LC series circuit according to an embodiment of this application.

FIG. 10 is a schematic diagram of another resonant switched capacitor DC/DC converter according to an embodiment of this application.

As shown in FIG. 10, the LC series circuit is connected between a first resonant switched capacitor group and a second resonant switched capacitor group. Specifically, a first end of Lz is connected to a second end A of a first switch Q1_1 in the first resonant switched capacitor group, and a second end of Cz is connected to a second end D of a second switch Q2_2 in the second resonant switched capacitor group. In other words, the LC series circuit is connected to a high-voltage side of the first resonant switched capacitor group and a low-voltage side of the second resonant switched capacitor group. Alternatively, the LC series circuit may be connected to a low-voltage side of the first resonant switched capacitor group and a high-voltage side of the second resonant switched capacitor group.

Figure 11:
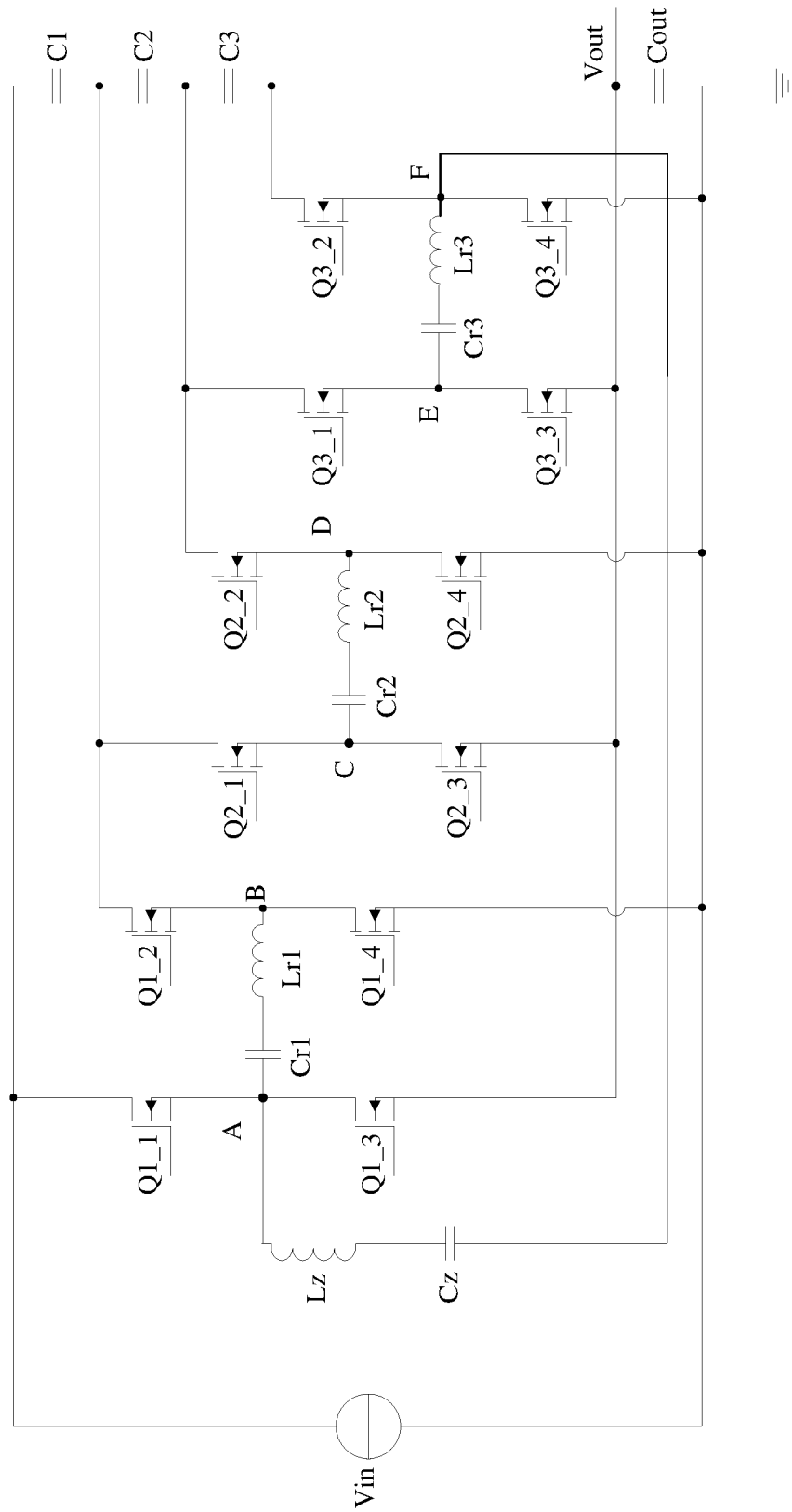
FIG. 11 is a schematic diagram of another hybrid connection of an LC series circuit according to an embodiment of this application.

With reference to FIG. 11, the following describes an implementation of another hybrid connection.

FIG. 11 is a schematic diagram of further still another resonant switched capacitor DC/DC converter according to an embodiment of this application.

As shown in FIG. 11, an LC series circuit is connected between a first resonant switched capacitor group and a third resonant switched capacitor group. Specifically, a first end of Lz is connected to a second end A of a first switch Q1_1 in the first resonant switched capacitor group, and a second end of Cz is connected to a second end F of a second switch Q3_2 in the third resonant switched capacitor group. In other words, the LC series circuit is connected to a high-voltage side of the first resonant switched capacitor group and a low-voltage side of the third resonant switched capacitor group. Alternatively, the LC series circuit may be connected to a low-voltage side of the first resonant switched capacitor group and a high-voltage side of the third resonant switched capacitor group.

It should be understood that the LC series circuit may alternatively be connected between a low-voltage side of a second resonant switched capacitor group and the high-voltage side of the third switched capacitor group, or may be connected between a high-voltage side of a second resonant switched capacitor group and the low-voltage side of the third switched capacitor group. Examples are not described one by one herein.

The foregoing descriptions of schematic diagrams all describe an example of three resonant switched capacitor groups. In other words, N is 3. N may alternatively be another integer. The following describes a case in which N is 2.

Figure 12:
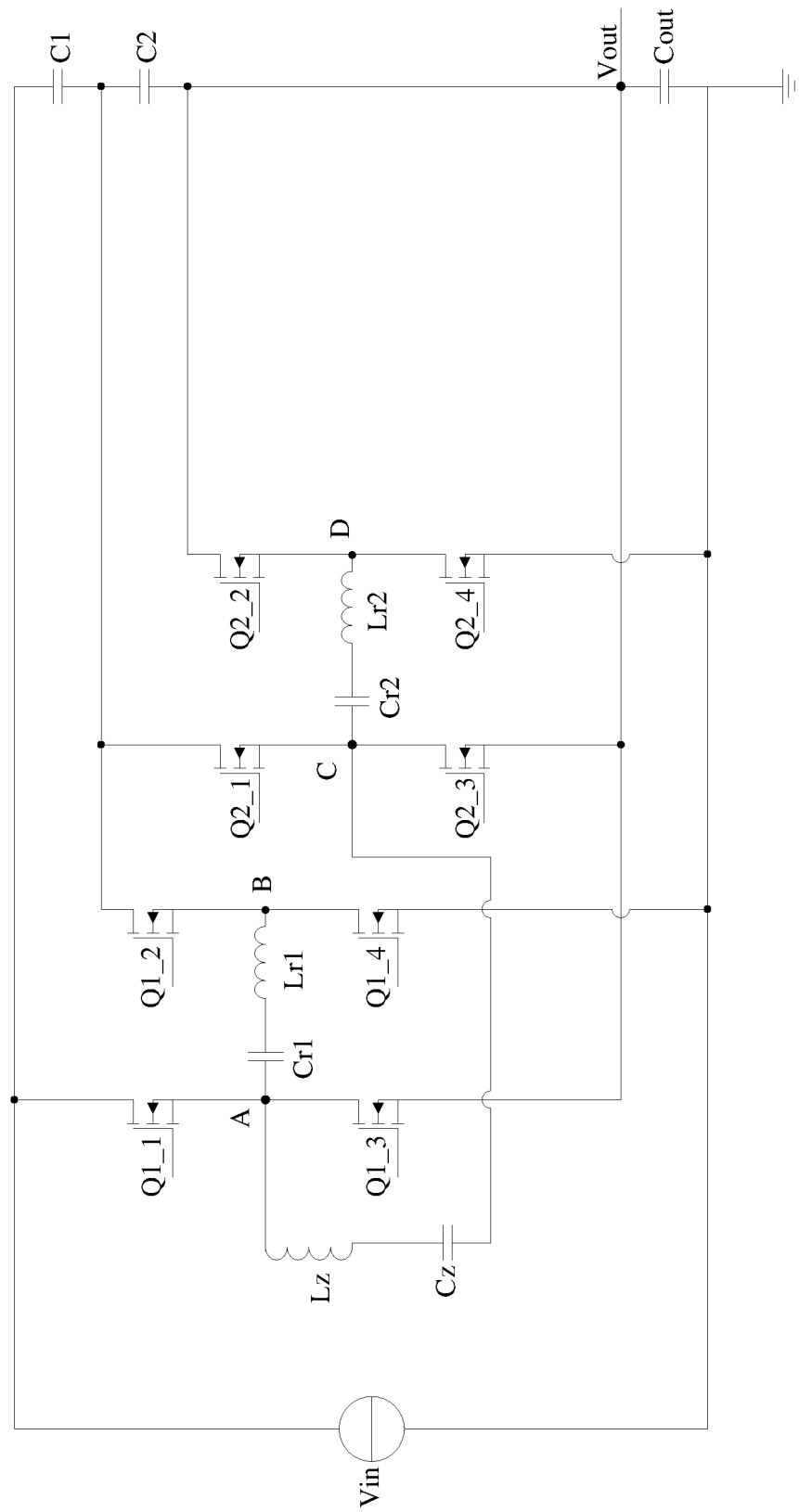
FIG. 12 is a schematic diagram of another resonant switched capacitor DC/DC converter according to an embodiment of this application.

FIG. 12 is a schematic diagram of another resonant switched capacitor DC/DC converter according to an embodiment of this application.

It may be learned from FIG. 12 that the resonant switched capacitor DC/DC converter includes two resonant switched capacitor groups, where a first resonant switched capacitor group corresponds to a first capacitor C1, and a second resonant switched capacitor group corresponds to a second capacitor C2.

As shown in FIG. 12, an LC series circuit is connected between the first resonant switched capacitor group and the second resonant switched capacitor group. Specifically, a first end of Lz is connected to a second end A of a first switch Q1_1 in the first resonant switched capacitor group, and a second end of Cz is connected to a second end C of a first switch Q2_1 in the second resonant switched capacitor group. In other words, two ends of the LC series circuit are respectively connected to a high-voltage side of the first resonant switched capacitor group and a high-voltage side of the second resonant switched capacitor group.

For an operation principle of FIG. 12, refer to the description of the text part corresponding to FIG. 4. The only difference is that FIG. 12 has one missing resonant switched capacitor group compared with FIG. 4, and a voltage conversion ratio is 3:1, while the voltage conversion ratio in FIG. 4 is 4:1. Others are the same. Details are not described herein in relation to FIG. 12 again.

It should be noted that in this application, there may be one or more first inductors in the LC series circuit in an actual product. A quantity of first inductors is not limited. Similarly, there may be one or more first capacitors in the LC series circuit in an actual product. A quantity of first capacitors is not limited.

The foregoing descriptions of schematic diagrams all describe an example in which one resonant switched capacitor group corresponds to one capacitor. In other words, M is equal to N. The resonant switched capacitor groups one-to-one correspond to the capacitors. In this case, a voltage conversion ratio is N+1.

The following describes a case in which at least one resonant switched capacitor group corresponds to a plurality of series-connected capacitors. This case is different from the foregoing description. A voltage conversion ratio of the converter is changed by changing a connection relationship between the resonant switched capacitor group and the corresponding capacitor. For example, the voltage conversion ratio is increased without increasing a quantity of the resonant switched capacitor groups. This reduces hardware circuits, reduces a circuit board area occupied by the entire converter, and reduces costs.

The following still describes an example of three resonant switched capacitor groups. However, a voltage conversion ratio of a corresponding converter is not 4:1.

Figure 13:
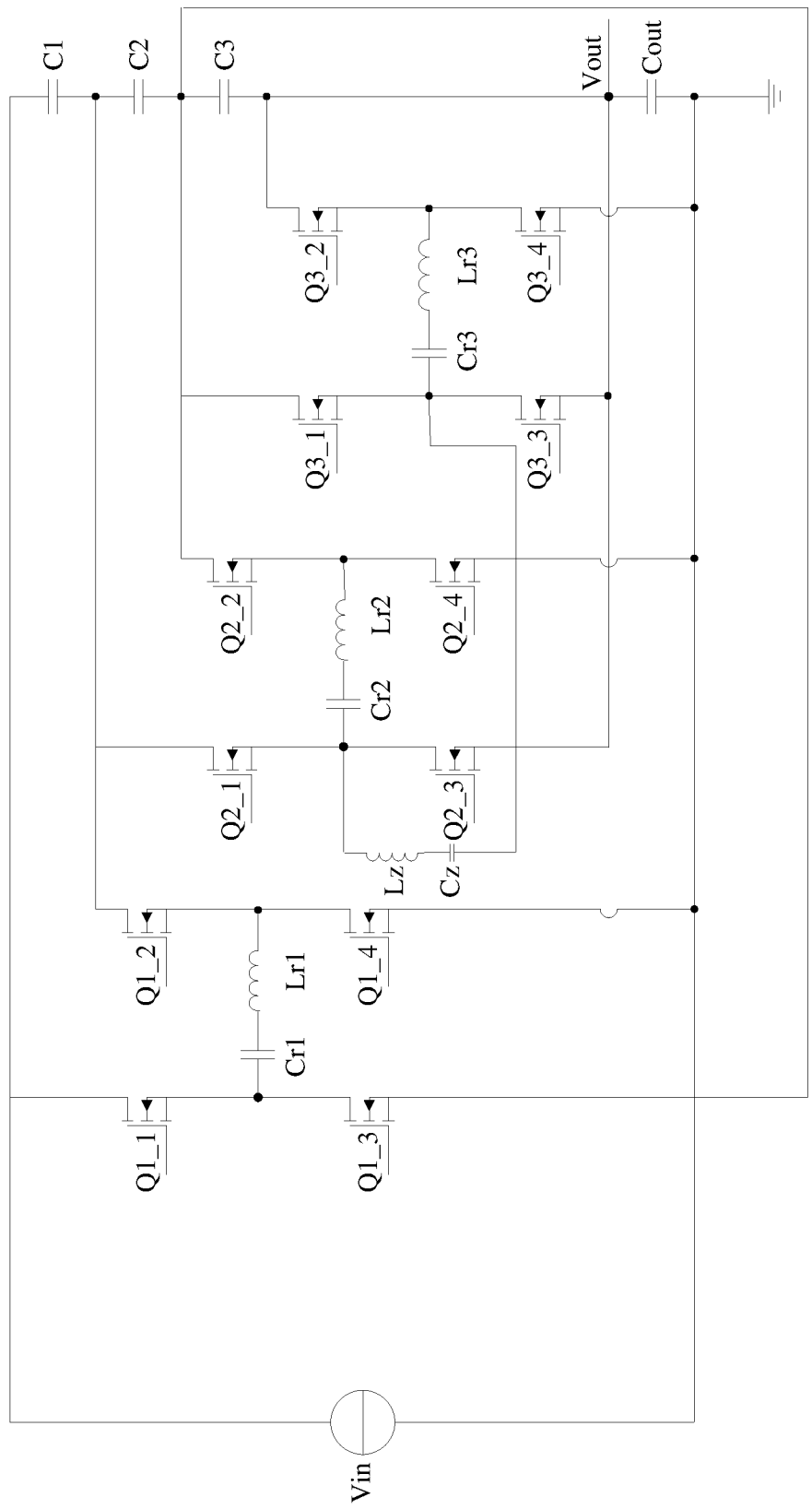
FIG. 13 is a schematic diagram of still another resonant switched capacitor DC/DC converter according to an embodiment of this application.

FIG. 13 is a schematic diagram of still another resonant switched capacitor DC/DC converter according to an embodiment of this application.

N resonant switched capacitor groups include at least a first-type resonant switched capacitor group and a second-type resonant switched capacitor group.

The first-type resonant switched capacitor group corresponds to at least two series-connected capacitors of M capacitors. Two input ends of the first-type resonant switched capacitor group are respectively connected to two ends of the at least two series-connected capacitors. In other words, the capacitors corresponding to the first-type resonant switched capacitor group are a plurality of capacitors that are connected in series. A quantity of the series-connected capacitors is not specifically limited.

The second-type resonant switched capacitor group corresponds to one capacitor of the M capacitors. Two input ends of the second-type resonant switched capacitor group are respectively connected to two ends of the corresponding capacitor of the M capacitors. In other words, resonant switched capacitor groups of the second-type resonant switched capacitor group still one-to-one correspond to the capacitors.

One converter may include a plurality of first-type resonant switched capacitor groups, or may include a plurality of second-type resonant switched capacitor groups. Specific quantities are not specifically limited.

A voltage conversion ratio of the resonant switched capacitor DC/DC converter shown in FIG. 13 is 5:1.

In FIG. 13, a second end of a third switch Q1_3 in a first resonant switched capacitor group is not connected to a first end of Cout, but connected to a first end of C3.

In addition, a connection position of a second end of a third switch in another resonant switched capacitor group may be further changed. The following describes another implementation in FIG. 14.

Figure 14:
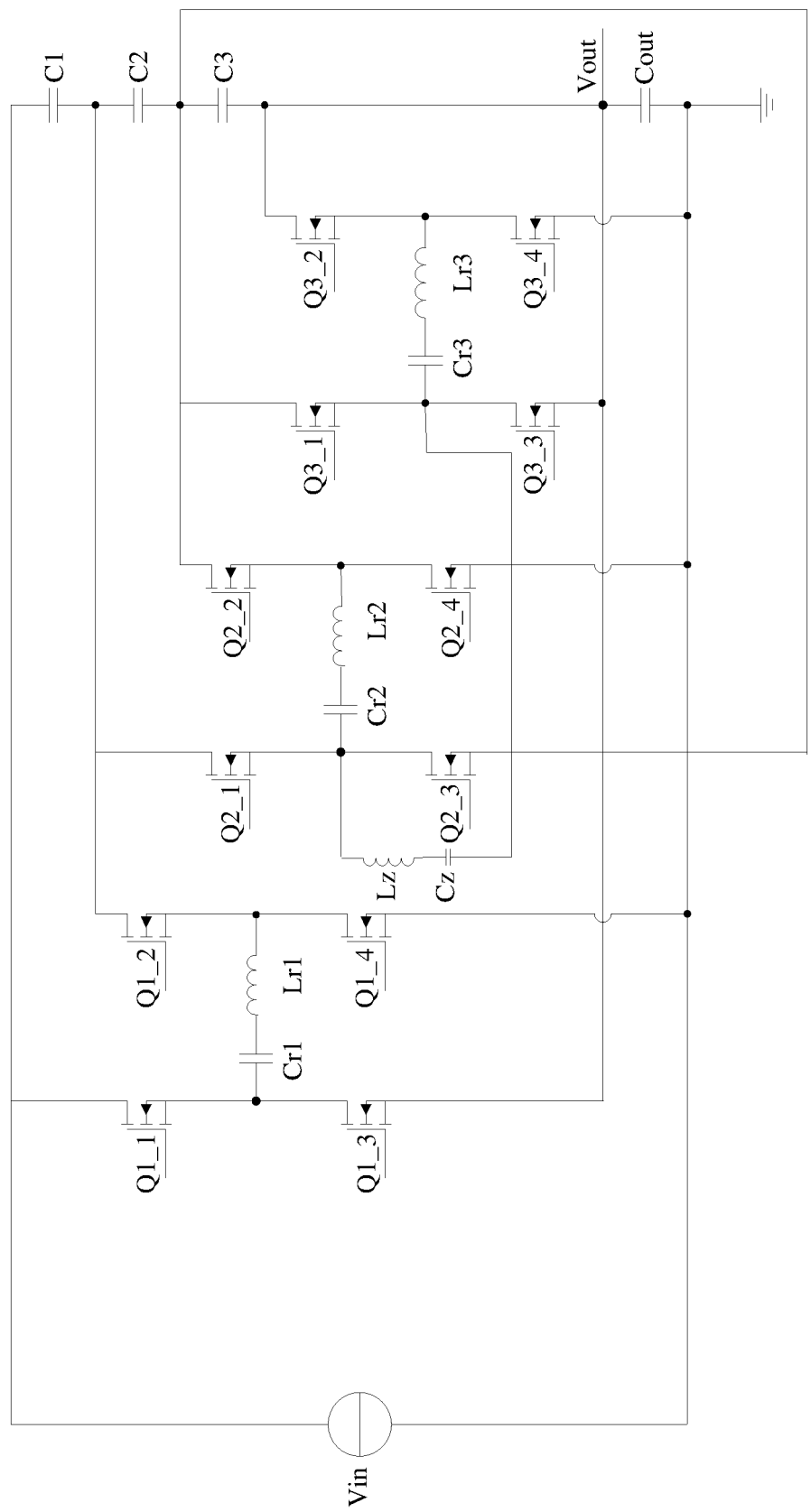
FIG. 14 is a schematic diagram of further still another resonant switched capacitor DC/DC converter according to an embodiment of this application.

FIG. 14 is a schematic diagram of further still another resonant switched capacitor DC/DC converter according to an embodiment of this application.

A voltage conversion ratio of the resonant switched capacitor DC/DC converter shown in FIG. 14 is 5:1.

In FIG. 14, a second end of a third switch Q2_3 in a second resonant switched capacitor group is not connected to a first end of Cout, but connected to a first end of C3.

The foregoing embodiments describe implementations in which the resonant switched capacitor DC/DC converter includes one LC series circuit. A quantity of LC series circuits included in one resonant switched capacitor DC/DC converter is not specifically limited in this application. With reference to the accompanying drawings, the following describes an implementation in which the resonant switched capacitor DC/DC converter includes two LC series circuits.

Figure 15:
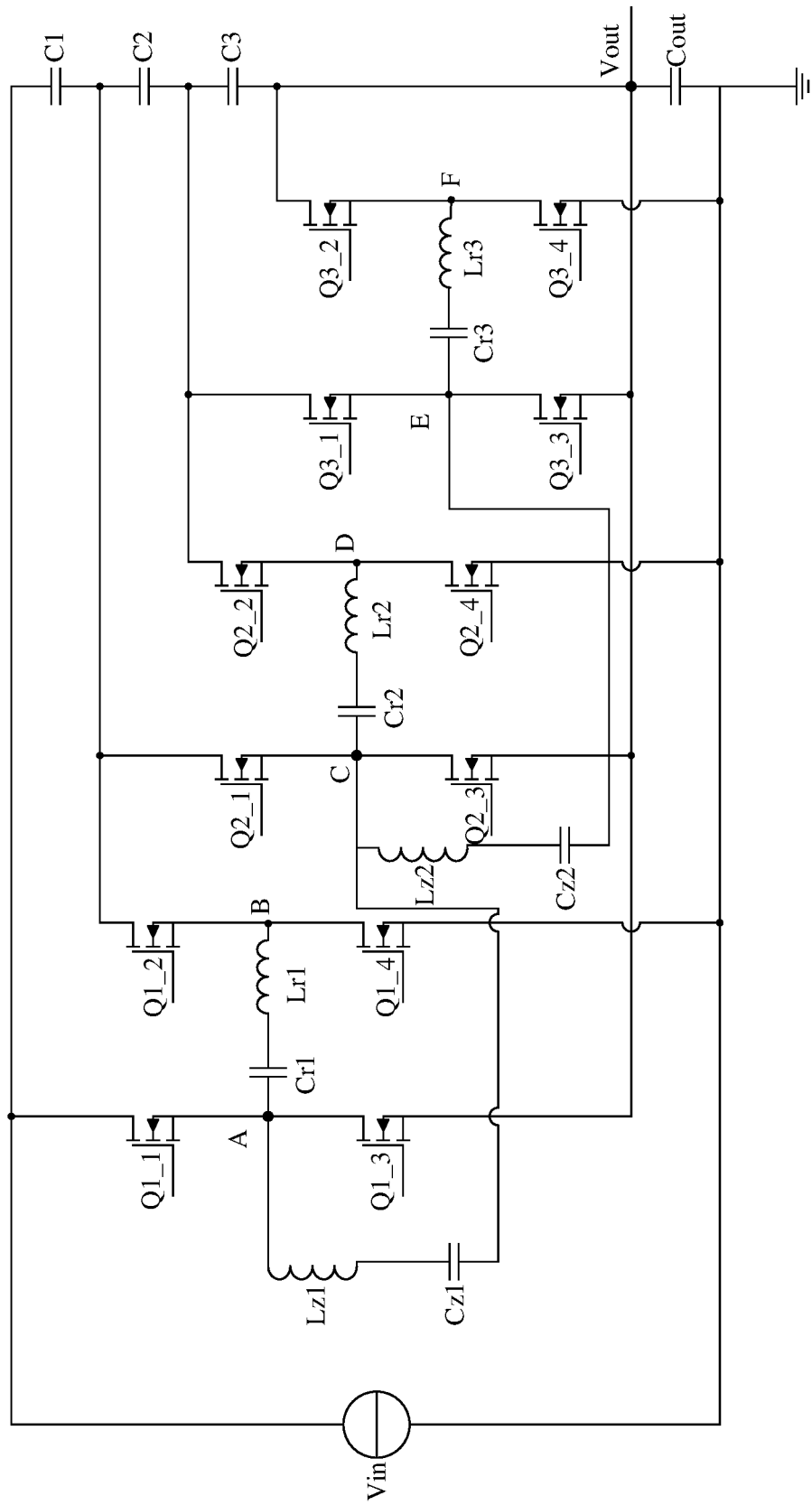
FIG. 15 is a schematic diagram of another resonant switched capacitor DC/DC converter according to an embodiment of this application.

FIG. 15 is a schematic diagram of another resonant switched capacitor DC/DC converter according to an embodiment of this application.

In this embodiment, an example in which the resonant switched capacitor DC/DC converter includes three resonant switched capacitor groups is still used for description.

The resonant switched capacitor DC/DC converter provided in this embodiment includes at least two LC series circuits, where a first LC series circuit (Lz1 and Cz1) is connected between a high-voltage side of a first resonant switched capacitor group and a high-voltage side of a second resonant switched capacitor group, and a second LC series circuit (Lz2 and Cz2) is connected between a high-voltage side of a second resonant switched capacitor group and a high-voltage side of a third resonant switched capacitor group.

As shown in FIG. 15, a first end of Lz1 is connected to a second end A of a first switch Q1_1 in the first resonant switched capacitor group, a second end of Lz1 is connected to a first end of Cz, and a second end of Cz is connected to a second end C of a first switch Q2_1 in the second resonant switched capacitor group.

A first end of Lz2 is connected to the second end C of the first switch Q2_1 in the second resonant switched capacitor group, a second end of Lz2 is connected to a first end of Cz2, and a second end of Cz2 is connected to a second end E of a first switch Q3_1 in the third resonant switched capacitor group.

FIG. 15 merely illustrates connection positions of the two LC series circuits as an example. In addition, there may be another connection relationship. For example, the second LC series circuit may alternatively be connected between the first resonant switched capacitor group and the third resonant switched capacitor group.

In addition, the resonant switched capacitor DC/DC converter may alternatively include three LC series circuits. For example, an LC series circuit is connected between the first resonant switched capacitor group and the second resonant switched capacitor group, an LC series circuit is connected between the first resonant switched capacitor group and the third resonant switched capacitor group, and an LC series circuit is connected between the second resonant switched capacitor group and the third resonant switched capacitor group.

Based on the resonant switched capacitor DC/DC converter provided in the foregoing embodiments, an embodiment of this application further provides a power system. The following provides detailed descriptions of example power systems with reference to the accompanying drawings.

Figure 16:
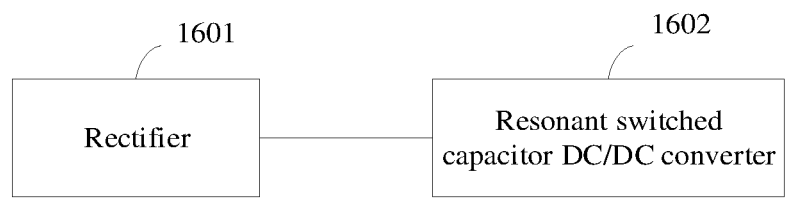
FIG. 16 is a schematic diagram of a power system according to an embodiment of this application.

FIG. 16 is a schematic diagram of a power system according to an embodiment of this application.

The power system provided in this embodiment of this application includes a rectifier 1601 and a resonant switched capacitor DC/DC converter 1602 described in the foregoing embodiments.

The rectifier 1601 has an input end connected to an alternating current power supply, and is configured to convert an alternating current voltage output by the alternating current power supply into a direct current voltage.

The resonant switched capacitor DC/DC converter 1602 has an input end connected to an output end of the rectifier 1601, and is configured to convert a direct current voltage output by the rectifier 1601 and then output.

Another voltage bucking circuit may be further included between the rectifier 1601 and the resonant switched capacitor DC/DC converter 1602, so that the voltage output by the rectifier 1601 is bucked to an input voltage range that the resonant switched capacitor DC/DC converter 1602 can bear.

It may be understood that the resonant switched capacitor DC/DC converter 1602 may be a boost converter, or may be a buck converter. For example, the converter may be used as a buck converter and buck 48 V to 12 V to be provided for a next-stage circuit or a load.

The power system provided in this embodiment of this application includes the resonant switched capacitor DC/DC converter 1602 described in the foregoing embodiments. Switches in the resonant switched capacitor DC/DC converter 1602 may implement soft switching. This reduces a switching loss in an operation process, reduces power consumption of the entire converter, improves power conversion efficiency of the converter, and can improve power supply efficiency of the power system.

Figure 17:
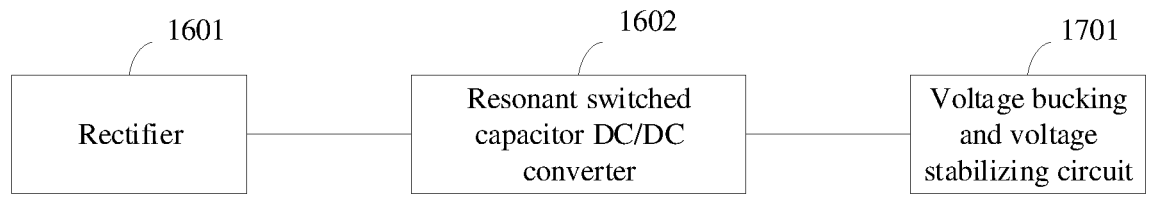
FIG. 17 is a schematic diagram of another power system according to an embodiment of this application.

FIG. 17 is a schematic diagram of another power system according to an embodiment of this application.

In addition to the resonant switched capacitor DC/DC converter 1602, the power system provided in this embodiment may further include a next stage: a voltage bucking and voltage stabilizing circuit 1701.

The voltage bucking and voltage stabilizing circuit 1701 has an input end connected to an output end of the resonant switched capacitor DC/DC converter 1602, and is configured to buck a voltage output by the resonant switched capacitor DC/DC converter and then output a stable voltage.

For example, the resonant switched capacitor DC/DC converter 1602 bucks a direct current voltage of 48 V to a direct current voltage of 12 V, and the voltage bucking and voltage stabilizing circuit 1701 performs voltage bucking and voltage stabilizing on the direct current voltage of 12 V, for example, to output stable 5 V or 3.3 V. In a possible implementation, the voltage bucking and voltage stabilizing circuit 1701 may be implemented by using a closed-loop voltage bucking circuit. Because the output voltage may be controlled in a closed-loop manner, a stable and controllable voltage may be output.

In the power system described in FIG. 17, a next-stage circuit having a voltage stabilizing function is connected to the resonant switched capacitor DC/DC converter 1602. Because the resonant switched capacitor DC/DC converter 1602 is an open-loop converter, stability of the output voltage cannot be ensured. In addition to the solution in FIG. 17, a previous-stage circuit having a voltage stabilizing function may be added to the resonant switched capacitor DC/DC converter 1602. The following provides detailed descriptions with reference to FIG. 18.

Figure 18:
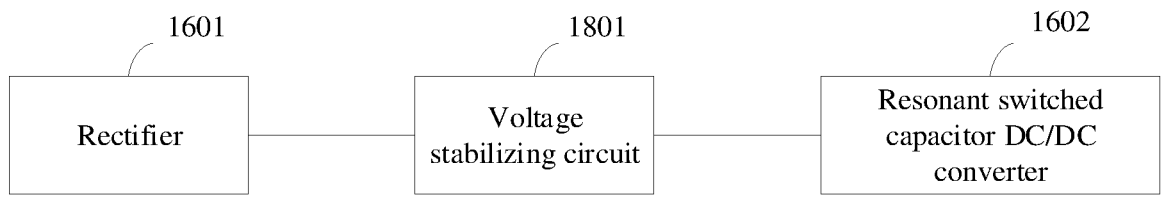
FIG. 18 is a schematic diagram of still another power system according to an embodiment of this application.

FIG. 18 is a schematic diagram of still another power system according to an embodiment of this application.

The power system provided in this embodiment further includes a voltage stabilizing circuit 1801.

The voltage stabilizing circuit 1801 is connected between the rectifier 1601 and the resonant switched capacitor direct current/direct current converter 1602, and is configured to stabilize a direct current voltage output by the rectifier 1601 and then provide for the input end of the resonant switched capacitor direct current/direct current converter 1602.

The voltage stabilizing circuit 1801 has a voltage stabilizing function, so that the output voltage is a very stable voltage. In other words, an input voltage of the resonant switched capacitor direct current/direct current converter 1602 is very stable. Therefore, the power system can ensure that the output voltage of the resonant switched capacitor direct current/direct current converter 1602 is also very stable, and is directly supplied to a load.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A resonant switched capacitor direct current/direct current converter, comprising: N resonant switched capacitor groups, M capacitors, and at least one LC series circuit, wherein N is an integer greater than or equal to 2, M is an integer less than or equal to N, and the at least one LC series circuit comprises a first inductor and a first capacitor that are connected in series;
    each resonant switched capacitor group of the N resonant switched capacitor groups comprises switches and a resonant circuit, wherein the resonant circuit comprises at least a resonant inductor and a resonant capacitor; and
    two ends of the at least one LC series circuit are respectively connected to resonant circuits in two different resonant switched capacitor groups of the N resonant switched capacitor groups,
    wherein each resonant switched capacitor group of the N resonant switched capacitor groups comprises at least a first switch, a second switch, a third switch, and a fourth switch;
    a first end of the first switch is connected to a first end of a capacitor corresponding to the each resonant switched capacitor group, and a first end of the second switch is connected to a second end of the capacitor corresponding to the each resonant switched capacitor group;
    a second end of the first switch is connected to a first end of the third switch, and a second end of the second switch is connected to a first end of the fourth switch,
    the resonant capacitor and the resonant inductor are connected in series and connected to the second end of the first switch and the second end of the second switch; and
    a second end of the third switch is connected to a second end of the output capacitor, and a second end of the fourth switch is connected to a first end of the output capacitor.

2. The converter according to claim 1, wherein the N resonant switched capacitor groups comprise at least a first-type resonant switched capacitor group and a second-type resonant switched capacitor group;
    the first-type resonant switched capacitor group corresponds to a group comprising at least two series-connected capacitors of the M capacitors, and two input ends of the first-type resonant switched capacitor group are respectively connected to two ends of the group of at least two series-connected capacitors; and
    the second-type resonant switched capacitor group corresponds to one capacitor of the M capacitors, and two input ends of the second-type resonant switched capacitor group are respectively connected to two ends of the corresponding one capacitor of the M capacitors.

3. The converter according to claim 1, wherein a first end of the at least one LC series circuit is connected to a second end of a first switching transistor in one resonant switched capacitor group of the two different resonant switched capacitor group, and a second end of the at least one LC series circuit is connected to a second end of a first switching transistor in the other resonant switched capacitor group of the two different resonant switched capacitor group.

4. The converter according to claim 1, wherein a first end of the at least one LC series circuit is connected to a second end of a second switching transistor in one resonant switched capacitor group of the two different resonant switched capacitor group, and a second end of the at least one LC series circuit is connected to a second end of a second switching transistor in the other resonant switched capacitor group of the two different resonant switched capacitor group.

5. The converter according to claim 1, wherein the first switch and the second switch are configured to act synchronously, and the third switch and the fourth switch are configured to act synchronously.

6. The converter according to claim 1, wherein each switch in a first resonant switched capacitor group of the N resonant switched capacitor groups has a phase of drive signals that is the same a phase of drive signals of a respective switch in each of the N resonant switched capacitor groups.

7. The converter according to claim 1, wherein phases of drive signals corresponding to all the resonant switched capacitor groups of the N resonant switched capacitor groups are staggered by a preset angle.

8. The converter according to claim 1, wherein M is equal to N, and the N resonant switched capacitor groups one-to-one correspond to the M capacitors; and
    two input ends of each resonant switched capacitor group of the N resonant switched capacitor groups are respectively connected to two ends of the corresponding capacitor of the M capacitors, and two output ends of each resonant switched capacitor group of the N resonant switched capacitor groups are respectively connected to two ends of an output capacitor.

9. The converter according to claim 8, wherein the output capacitor and N capacitors are connected in series and connected between two input ends of the converter, and the output capacitor is connected between two output ends of the converter;
    the two input ends of the converter are connected to two ends of a direct current power supply; and
    the converter is configured to buck a voltage of the direct current power supply and output the bucked voltage.

10. The converter according to claim 8, wherein the output capacitor and N capacitors are connected in series and connected between two output ends of the converter, and the output capacitor is connected between two input ends of the converter;
    the two input ends of the converter are connected to two ends of a direct current power supply; and
    the converter is configured to boost a voltage of the direct current power supply and output the boosted voltage.

11. The converter according to claim 8, wherein when N is equal to M, a voltage conversion ratio of the converter is N+1.

12. The converter according to claim 1, wherein an inductance value of the first inductor is greater than an inductance value of the resonant inductor.

13. The converter according to claim 12, wherein a capacitance value of the first capacitor is greater than a capacitance value of the resonant capacitor.

14. A power system, comprising a rectifier and a resonant switched capacitor direct current/direct current converter according to claim 1, wherein
- the rectifier has an input end connected to an alternating current power supply, and is configured to convert an alternating current voltage output by the alternating current power supply into a direct current voltage; and
- the resonant switched capacitor direct current/direct current converter has an input end connected to an output end of the rectifier, and is configured to convert a direct current voltage output by the rectifier and output the converted direct current voltage.

15. The power system according to claim 14, further comprising: a voltage bucking and voltage stabilizing circuit, wherein
- the voltage bucking and voltage stabilizing circuit has an input end connected to an output end of the resonant switched capacitor direct current/direct current converter, and is configured to buck a voltage output by the resonant switched capacitor direct current/direct current converter and output a stable voltage.

16. The power system according to claim 14, further comprising: a voltage stabilizing circuit, wherein
- the voltage stabilizing circuit is connected between the rectifier and the resonant switched capacitor direct current/direct current converter, and is configured to stabilize a direct current voltage output by the rectifier and provide for the resonant switched capacitor direct current/direct current converter.

17. A resonant switched capacitor direct current/direct current converter, comprising: N resonant switched capacitor groups, M capacitors, and at least one LC series circuit, wherein N is an integer greater than or equal to 2, M is an integer less than or equal to N, and the at least one LC series circuit comprises a first inductor and a first capacitor that are connected in series;
- each resonant switched capacitor group of the N resonant switched capacitor groups comprises switches and a resonant circuit, wherein the resonant circuit comprises at least a resonant inductor and a resonant capacitor; and
- two ends of the at least one LC series circuit are respectively connected to resonant circuits in two different resonant switched capacitor groups of the N resonant switched capacitor groups,
- wherein the N resonant switched capacitor groups comprise at least a first-type resonant switched capacitor group and a second-type resonant switched capacitor group;
- the first-type resonant switched capacitor group corresponds to a group comprising at least two series-connected capacitors of the M capacitors, and two input ends of the first-type resonant switched capacitor group are respectively connected to two ends of the group of at least two series-connected capacitors; and
- the second-type resonant switched capacitor group corresponds to one capacitor of the M capacitors, and two input ends of the second-type resonant switched capacitor group are respectively connected to two ends of the corresponding one capacitor of the M capacitors.

* * * * *